US012450385B2

(12) United States Patent
Widmer et al.

(10) Patent No.: US 12,450,385 B2
(45) Date of Patent: Oct. 21, 2025

(54) INTEGRATION OF IDENTITY ACCESS MANAGEMENT INFRASTRUCTURE WITH ZERO-KNOWLEDGE SERVICES

(71) Applicant: Dashlane SAS, Paris (FR)

(72) Inventors: Ludovic Widmer, Paris (FR); Corentin Mors, Lyons (FR); Cyril Leclerc, Paris (FR); Tony Oreglia, Lisbon (PT); Guillaume Maron, Paris (FR); Frédéric Rivain, Brooklyn, NY (US)

(73) Assignee: Dashlane SAS, Paris (FR)

( * ) Notice: Subject to any disclaimer, the term of this patent is extended or adjusted under 35 U.S.C. 154(b) by 365 days.

(21) Appl. No.: 18/124,326

(22) Filed: Mar. 21, 2023

(65) Prior Publication Data

US 2024/0012933 A1 Jan. 11, 2024

Related U.S. Application Data

(60) Provisional application No. 63/358,713, filed on Jul. 6, 2022.

(51) Int. Cl.
*H04L 29/06* (2006.01)
*G06F 21/00* (2013.01)
*G06F 21/62* (2013.01)
*H04L 9/08* (2006.01)
*H04L 9/32* (2006.01)

(52) U.S. Cl.
CPC ........ *G06F 21/6245* (2013.01); *H04L 9/0894* (2013.01); *H04L 9/3213* (2013.01); *H04L 9/3218* (2013.01)

(58) Field of Classification Search
CPC . G06F 21/6245; H04L 9/0894; H04L 9/3213; H04L 9/3218; H04L 9/0822
See application file for complete search history.

(56) References Cited

U.S. PATENT DOCUMENTS 5,434,918 A 7/1995 Kung et al.
5,495,533 A 2/1996 Linehan et al.
(Continued)

FOREIGN PATENT DOCUMENTS

WO WO-2024228951 A1 * 11/2024 ............. H04L 9/008

OTHER PUBLICATIONS

Apple Technical White Paper (Best Practices for Deploying FileVault 2, Aug. 2012, 42 pages) (Year: 2012).
(Continued)

*Primary Examiner* — Lisa C Lewis

(57) ABSTRACT

A system and method for protecting user data using a key escrow service. The key escrow service may be hosted by a service provider to integrate Identity Access Management (IAM) solutions, such as Single-Sign-On (SSO) and/or System for Cross-domain Identity Management (SCIM), with a zero-knowledge service, such as a password manager or other service handling sensitive user data. In examples, secure enclave technology may be used to allow the service provider to host and manage the key escrow service without being able to access any cryptographic key used and/or stored within a secure enclave. Accordingly, in some aspects, the service provider may have the ability to store users' secret keys for SSO and sharing keys for SCIM in a trusted, secure storage location without breaking the zero-knowledge principles of the infrastructure.

20 Claims, 13 Drawing Sheets

(56) References Cited

U.S. PATENT DOCUMENTS

| | | | |
|---|---|---|---|
| 5,560,008 | A | 9/1996 | Johnson et al. |
| 5,684,951 | A | 11/1997 | Goldman et al. |
| 6,044,155 | A | 3/2000 | Thomlinson et al. |
| 8,006,280 | B1 | 8/2011 | Hildebrand et al. |
| 8,028,329 | B2 | 9/2011 | Whitcomb |
| 8,059,818 | B2 | 11/2011 | Asokan et al. |
| 8,601,600 | B1 | 12/2013 | Shankar |
| 10,546,142 | B2 | 1/2020 | Hakhinian |
| 11,240,007 | B1 * | 2/2022 | Higgins ............... H04L 9/3268 |
| 2002/0122553 | A1 | 9/2002 | Kao |
| 2003/0177401 | A1 | 9/2003 | Arnold |
| 2005/0222963 | A1 | 10/2005 | Johnson |
| 2006/0235796 | A1 | 10/2006 | Johnson et al. |
| 2008/0104709 | A1 | 5/2008 | Averyt et al. |
| 2008/0155276 | A1 | 6/2008 | Chen et al. |
| 2009/0055642 | A1 | 2/2009 | Myers |
| 2009/0235346 | A1 | 9/2009 | Steinberg |
| 2009/0287935 | A1 | 11/2009 | Aull |
| 2010/0017616 | A1 | 1/2010 | Nichols et al. |
| 2010/0083358 | A1 | 4/2010 | Govindarajan et al. |
| 2010/0100945 | A1 | 4/2010 | Ozzie et al. |
| 2010/0172504 | A1 | 7/2010 | Allen |
| 2010/0174911 | A1 | 7/2010 | Isshiki |
| 2011/0252243 | A1 | 10/2011 | Brouwer |
| 2012/0072979 | A1 | 3/2012 | Cha et al. |
| 2012/0209735 | A1 | 8/2012 | Subramanian |
| 2013/0111217 | A1 | 5/2013 | Kopasz et al. |
| 2013/0144786 | A1 | 6/2013 | Tong |
| 2013/0145447 | A1 | 6/2013 | Maron |
| 2013/0205360 | A1 | 8/2013 | Novak |
| 2013/0227047 | A1 | 8/2013 | Dolce |
| 2016/0148201 | A1 | 5/2016 | Kadaster |
| 2016/0380985 | A1 * | 12/2016 | Chhabra ............... H04L 63/061 713/171 |
| 2017/0093805 | A1 | 3/2017 | Proulx |
| 2018/0013562 | A1 | 1/2018 | Haider |
| 2018/0183777 | A1 | 6/2018 | Guillory et al. |
| 2018/0323970 | A1 | 11/2018 | Maron |
| 2019/0149332 | A1 | 5/2019 | Rivain et al. |
| 2019/0268156 | A1 | 8/2019 | Delmas et al. |
| 2019/0356649 | A1 | 11/2019 | Alwen |
| 2020/0280452 | A1 | 9/2020 | Pahl |
| 2023/0008003 | A1 * | 1/2023 | Damiano ............... H04L 9/0891 |
| 2023/0076420 | A1 * | 3/2023 | Fytraki ................. H04L 9/088 |

OTHER PUBLICATIONS

"LastPass Gets the Green Light from Security Now!'s Steve Gibson", LastPass Blog, (http://blog.lastpass.com/2010/07/lastpass-gets-green-light-from-security.html), Jul. 21, 2010, 11 pages.

Dashlane Security Whitepaper, Nov. 2011, https://www.dashlane.com/download/Security-Whitepaper-Final-Nov-2011.pdf., 9 pages.

Encryption—How does LastPass store my passwords on their website?, Stack Exchange, (http://webapps.stackexchange.com/questions/11361/how-does-lastpass-store-my-passwords-on-their-website), Jan. 16, 2011, 2 pages.

* cited by examiner

INTEGRATION OF IDENTITY ACCESS MANAGEMENT INFRASTRUCTURE WITH ZERO-KNOWLEDGE SERVICES

CROSS-REFERENCE TO RELATED APPLICATIONS

This application claims the benefit of U.S. Provisional Patent Application No. 63/358,713, titled "INTEGRATION OF IDENTITY ACCESS MANAGEMENT INFRASTRUCTURE WITH ZERO-KNOWLEDGE SERVICES," filed Jul. 6, 2022, which is incorporated by reference herein in its entirety.

BACKGROUND

Single-Sign-On (SSO) authentication, which allows users to sign into various systems with a single set of credentials, is oftentimes useful to implement in enterprise information technology infrastructures that may include a variety of business applications/services (e.g., email, messaging, corporate intranet). For instance, SSO may limit a number of authentication credential sets that users have to remember and may provide an enterprise with centralized control of user access to various enterprise services and/or information. This may enable the enterprise to ensure password policies are enforced, provide a centralized audit trail, control a level of access each user has, etc. Technical problems may arise, however, when applications that store and provide access to sensitive encrypted data, such as secure password managers, are integrated with an Identity Access Management (IAM) infrastructure and solutions such as SSO or SCIM (System for Cross-domain Identity Management).

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

As will also be understood from the foregoing disclosure, in an aspect, the present technology relates to a system and method for protecting user data. In an example, a method for protecting user data includes: establishing a secure enclave on a parent server; receiving, at the secure enclave, an enclave local key; storing the enclave local key; establishing a channel between a client application and the secure enclave; receiving, at the secure enclave and from the client application, proof of authentication for a user; verifying, by the secure enclave, the proof of authentication; decrypting, by the secure enclave, a domain master key for a domain of the user using the enclave local key; determining, by the secure enclave, a user's secret data based on the domain master key; and providing to the client application the user's secret data via the channel.

In another example, a system for protecting user data includes: at least one processor; and memory storing instructions that, when executed by the at least one processor, cause the system to: establish a secure enclave on a parent server; receive, at the secure enclave, an enclave local key; store the enclave local key; establish a channel between a client application and the secure enclave; receive, at the secure enclave and from the client application, proof of authentication for a user; verify, by the secure enclave, the proof of authentication; decrypt, by the secure enclave, a domain master key for a domain of the user using the enclave local key; determine, by the secure enclave, a user's secret data based on the domain master key; and provide to the client application the user's secret data via the channel.

In another example, a computer-readable medium stores instructions that, when executed by a computer, cause the computer to: establish a secure enclave on a parent server; receive, at the secure enclave, an enclave local key; store the enclave local key; establish a channel between a client application and the secure enclave; receive, at the secure enclave and from the client application, proof of authentication for a user; verify, by the secure enclave, the proof of authentication; decrypt, by the secure enclave, a domain master key for a domain of the user using the enclave local key; determine, by the secure enclave, a user's secret data based on the domain master key; and provide to the client application the user's secret data via the channel.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following figures.

DETAILED DESCRIPTION

Figure 1:
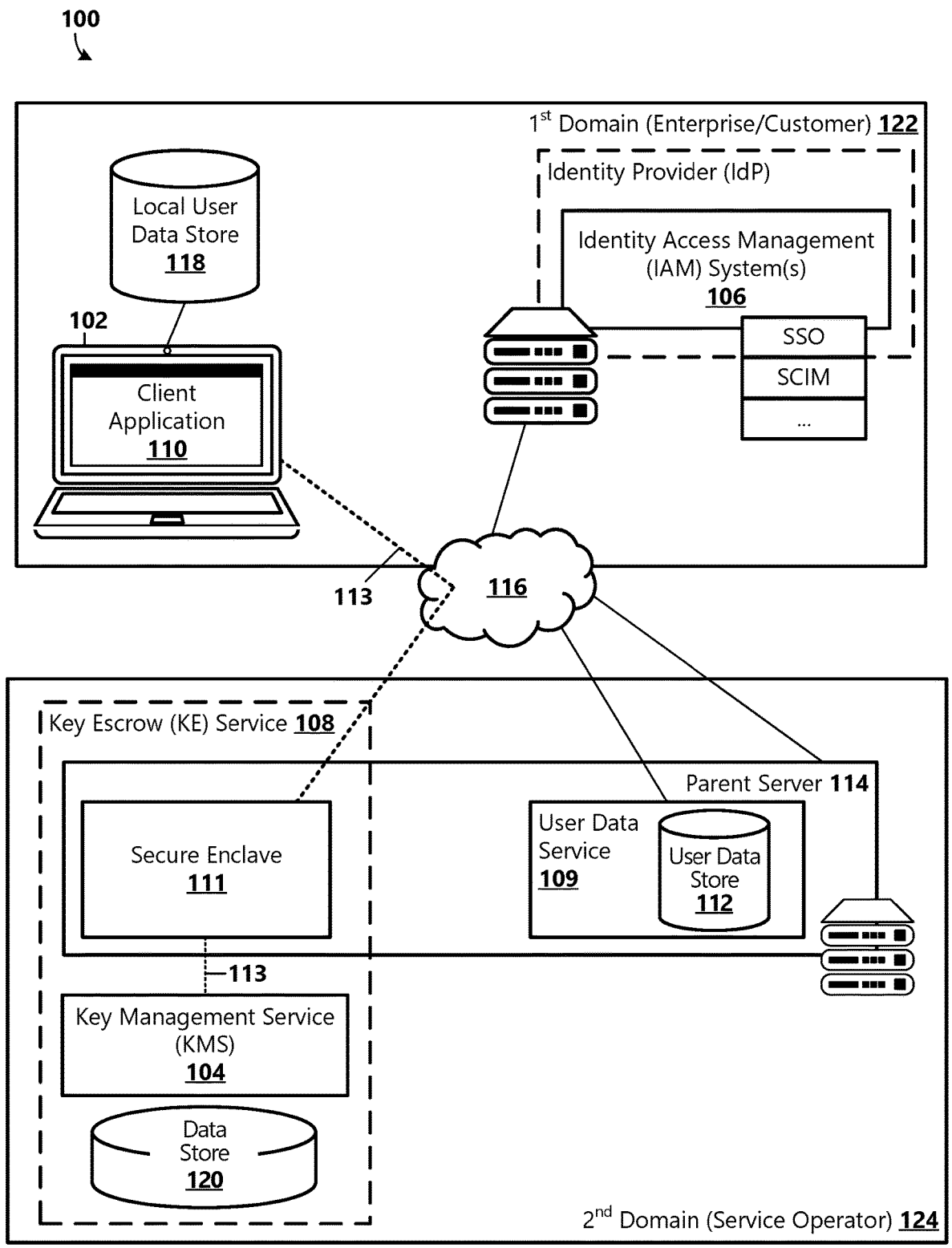
FIG. 1 illustrates a system for providing a key escrow (KE) service in a zero-knowledge architecture according to an example.

In the following detailed description, references are made to the accompanying drawings that form a part hereof, and in which are shown by way of illustrations specific embodiments or examples. However, examples may be implemented in many different forms and should not be construed as limited to the embodiments set forth herein; rather, these examples are provided so that this disclosure will be thorough and complete, and will fully convey the scope of the examples to those skilled in the art. Examples may be practiced as methods, systems, or devices. Accordingly, examples may take the form of a hardware implementation, an entirely software implementation or an implementation combining software and hardware aspects. The following detailed description is, therefore, not to be taken in a limiting sense.

A zero-knowledge architecture may reduce, limit, or remove unauthorized access to user data. For example, a service handling sensitive user data (e.g., passwords, identification, financial information) may implement zero-knowledge principles of a zero-knowledge architecture, where the service does not have access to the user data stored, processed, or transmitted by servers in the computing environment implementing the service. In some examples of a zero-knowledge architecture, sensitive user data may be encrypted by an application at a user device prior to being provided to the service and may be decrypted by the application at the user device for access by the user. As a result of such encryption and decryption techniques, the service may be unable to access the plaintext content of the user data on its servers and may instead only have access to the encrypted representation of the user data.

In some examples, an Identity Access Management (IAM) infrastructure may be used to facilitate and control provisioning and access to computing resources and services of an enterprise. For instance, solutions such as SSO (Single-Sign-On) and/or SCIM (System for Cross-domain Identity Management) may be used to facilitate the enterprise's security policies for computing services, such as email services, messaging services, networking services (e.g., Intranet, Internet, network folders), etc. According to examples of the present disclosure, IAM may be connected to a zero-knowledge architecture service, such as a password management service or other service handling sensitive user data.

Technical problems may arise when integrating IAM with a zero-knowledge architecture. For example, using the encryption and decryption techniques described above in association with a zero-knowledge architecture, a client application may typically use a secret key derived from a master password that may be known to the user and that is used to access the client application. However, in SSO, for example, the users may authenticate themselves to their Identity Provider (IdP) rather than to the client application. Thus, there may not be a master password specific to the client application and thus the master password cannot be used to derive the secret key for encryption.

One solution may include implementing a server component, acting as a Key Escrow (KE) in the SSO flow. The server component may be configured to hold a random secret key per user, which may be used to encrypt/decrypt user data, and which may be delivered to the client application upon successful SSO authentication with the IdP. While such an implementation may be workable, various security vulnerabilities may be introduced. For example, if the KE is compromised, secret keys for a plurality of users can be accessed and stolen. Thus, in some examples, the KE may be deployed inside an enterprise's perimeter (e.g., behind the enterprise's firewall), in such a way that the service provider cannot access the user secret keys and as a result decrypt encrypted user data that may be stored remotely by the service for synchronization purposes. However, in some examples, the enterprise may not have the technical skills, computing, network, or financial resources to deploy and maintain such a secure component within their infrastructure. Thus, another solution may include allowing the service provider or a third-party to host the KE. However, this solution may violate the zero knowledge model because the service provider or the third-party would be able to access users' secret keys, and thus sensitive user data. For example, in the case of the service provider hosting the KE, the service provider would have access to user secret keys and to encrypted user data that may be stored remotely by the service for synchronization purposes.

Accordingly, systems and methods may be implemented to provide a KE service hosted by a service provider to integrate IAM solutions, such as SSO and/or SCIM, with a zero-knowledge service (sometimes referred to herein as a user data service), such as a password manager or other service handling sensitive user data. In examples, secure enclave technology may be used to allow the service provider to host and manage the KE service without being able to access any cryptographic key used and/or stored within a secure enclave. Secure enclave technology, also referred to as a Trusted Execution Environment (TEE), refers generally to technologies providing a runtime environment that is securely isolated (central processing unit(s) and memory are dedicated to the environment and not shared with other processes). Moreover, secure enclaves provide a way to prove to a client their identity and the code that runs within the enclave(s), so that clients know they are talking to the right secure enclave running authorized program(s). However, because the secure enclave cannot be accessed by the service provider if it crashes, then the service provider would not be able to restart it in an identical state. That is, any cryptographic key inside the secure enclave may be lost. In examples, pairing the secure enclave with the KMS circumvents this issue and provides the ability to restart the secure enclave without the service provider being able to access cryptographic keys.

In some examples, the storage of the users' secret keys is still an issue, as, in examples, secure enclaves cannot store persistent data. Accordingly, users' secret keys may be securely stored outside of the secure enclave. For example, a key management service (KMS) is included. According to an example implementation, a local key for the secure enclave (enclave local key ($k_{E-L}$)) may be generated and used to encrypt users' secret keys. The enclave local key $k_{E-L}$ may be securely stored by the KMS. In examples, this is done by generating and storing an enclave master key ($k_{E-M}$), which can be used to encrypt the enclave local key ($k_{E-L}$). The enclave local key ($k_{E-L}$) encrypted by the enclave master key ($k_{E-M}$) ($k_{E-M}(k_{E-L})$) may then be stored (e.g., in a standard database). As can be appreciated, in the event of the secure enclave crashing and being respawned, the enclave local key ($k_{E-L}$) used to encrypt users' secret keys before storing them in the standard database can be retrieved. According to examples, the KMS may be configured to grant access to the enclave master key ($k_{E-M}$) only to an authenticated secure enclave using secure enclaves' ability to provide a way to prove to a client their identity and integrity of the code that runs within the enclave. In some examples, this can be used to spawn multiple secure enclaves working as a cluster to meet scale and workload demand on the secure enclave. In this instance, the enclave master key ($k_{E-M}$) and the enclave local key ($k_{E-L}$) are the same keys for all instances.

In examples, therefore, users can authenticate themselves by SSO with the KE service hosted by the service provider without an ability for the service provider to learn the secret of its vault (e.g., secret key for stored encrypted user data).

In such examples, there is no need for the user (or the IT administrator(s) of the user's organization) to install and maintain the KE service inside its own infrastructure. Integration of SCIM with a user data service may include authenticating an event of group management received from an external system through the SCIM protocol (e.g., adding a user to a group and/or removing the user from a group). In an example aspect, for SCIM, the KE service may act as an administrative user of the enterprise domain and may protect sharing keys with the use of the secure enclave and KMS.

As will be understood from examples in the following disclosure, various technical advantages may result from the present technology. For instance, providing KE as a service may provide improved convenience and security for applications that store and provide access to sensitive encrypted data when integrating with an IAM infrastructure and solutions such as SSO or SCIM. In some examples, the KE service may be utilized by enterprises that may otherwise deploy a highly sensitive KE component in what may be a poorly secured environment. For instance, if a KE is deployed in a poorly secured environment, a user or malicious actor may be able to access and share secret keys without traceability. Additionally, in examples, encrypted data may be stored locally on a user computing device (e.g., encrypted data may get written to storage on the user computing device for performance reasons). Thus, in some examples, compromising the secret keys can lead to a full compromise of the user data if a malicious user is able to access the encrypted user data. As will be described in further detail below, the service provider may be enabled to manage the KE service for enterprises while being prevented from accessing the contents of it. Accordingly, in some aspects, the service provider may have the ability to store users' secret keys for SSO and sharing keys for SCIM in a trusted, secure storage location without breaking the zero-knowledge principles of the infrastructure.

With reference now to FIG. 1, an example system 100 is illustrated in which a KE service 108 may be implemented for integrating Identity Access Management (IAM) in a zero-knowledge architecture. As shown, the example system 100 includes a user computing device 102 and an IAM system 106 (also referred to as an IdP) operating in a first domain 122 and a user data service 109 and the KE service 108 operating in a second domain 124. The user data service 109 may operate on one or more parent servers 114, and a client application 110 of the user data service 109 may operate on the user computing device 102. In some examples, the KE service 108 includes a secure enclave 111, a key management service (KMS) 104 able to securely identify the secure enclave 111, and a data store 120. In some examples, the secure enclave 111 is located on the parent server 114. In some examples, the KMS 104 and/or data store 120 may operate on another server in the second domain 124. In other examples, the KMS 104 and/or data store 120 may be configured to operate on a $3^{rd}$ party server or on the parent server 114.

According to examples of the present disclosure, one or more IAM systems 106 may be configured to operate as the IdP for the user data service 109. For example, the IAM system 106 may define and manage user identities and access permissions of users of the enterprise/customer. Non-limiting examples of IAM systems 106 include an SSO system and a SCIM system. For instance, SSO and SCIM have many benefits (e.g., limiting the number of passwords users have to remember, providing a way to make sure password policies are enforced, and providing a centralized audit trail). Accordingly, in an enterprise context, IT administrators often want to integrate as many services as possible with their enterprise IAM system 106. As should be appreciated, other types of IAM systems 106 may be included according to examples and are within the scope of the present disclosure. An example SSO flow for a user login may include authenticating the user through the IdP and then passing authentication proof to the target application.

As used herein, a domain refers to a group of computing resources that are accessible according to a common security architecture or within a defined security boundary. In some examples, the first domain 122 may include a network environment of an enterprise or customer of a service provider of the user data service 109. For example, the parent server 114 implemented in the second domain 124 may be implemented in the service provider's network environment. According to an example implementation, the client application 110 may be a password manager, a secure document storage solution, or other sensitive data management solution that communicates with the user data service 109. The user data service 109, for example, may operate on the parent server 114 to store and access encrypted user data, such as passwords, financial information, or other sensitive information for one or more users associated with the first domain 122 (e.g., employees or other users of the enterprise/customer).

The user data service 109, for example, may store encrypted user data in a user data store 112. The user data service 109 may be offered to the enterprise so that the enterprise's employees (users) can store their data securely and access such data anywhere (e.g., when communicatively connected). In some examples, encrypted user data may additionally be stored locally on the user computing device 102 in a local user data store 118. The user data store 112 and local user data store 118 may comprise a storage device (e.g., computer memory, a hard drive, a flash drive, etc.), a database, or a file server, among other data stores. As should be appreciated, a variety of applications 110 and/or services 109 may be used according to aspects disclosed herein.

In an example, the user data stored in the user data store 112 and/or local user data store 118 may be encrypted by the client application 110 using a cryptographic key (herein referred to as a user's secret key ($k_{U-S}$)) derived from a master key. A variety of cryptographic algorithms may be used, including, but not limited to, Advanced Encryption Standard (AES), Data Encryption Standard (DES), Rivest-Shamir-Adleman (RSA), and Elliptic Curve Cryptography (ECC), among others. In an example, the encrypted user data may comprise an encrypted password, an encrypted cryptographic key, an encrypted document/file, etc. According to an example, the encrypted user data may be encrypted by the user secret key, wherein the application 110 may generate the user secret key used to generate the encrypted data.

According to an example implementation, the service provider of the user data service 109 may additionally host one or more components of the KE service 108 in the second domain 124 without being able to learn anything about the users' secret keys, or more generally, access user data. Although examples of the present disclosure discuss specific implementations of protecting users' secret keys, the present systems and methods may be used to protect any kind of sensitive data, which may also be referred to herein as users' secret data or user's secret data, as applicable. Thus, the service provider may securely host the KE service 108 in its own infrastructure without breaking principles of a zero-knowledge architecture. To achieve a zero-knowledge architecture, the KE service 108 may include a secure enclave 111 bound to a KMS 104. The secure enclave 111 may be configured and bound to the parent server 114 using various secure enclave technologies, such as INTEL SGX, AWS NITRO, or others. According to an example implementation, the parent server 114 may provide the secure enclave 111 with computing resources (e.g., CPU, memory, network access), where the computing resources of the secure enclave 111 are isolated from the rest of the parent server 114 to create a secure/trusted environment. For example, the secure enclave 111 may be configured as a TEE, where a runtime environment is securely isolated (e.g., central processing unit(s) and memory is dedicated to the environment and not shared with other processes). For instance, after the secure enclave 111 is initiated, processors and memory allocated to the secure enclave 111 may only be accessed by the secure enclave 111. Thus, code executed in the secure enclave 111 and any data stored within the secure enclave 111 cannot leak (or be accessed) outside of it. In some examples, a "threat model" may be configured to consider the parent server 114 as a not trusted environment. In examples, communications from the secure enclave 111 to external systems (e.g., the client application 110, the KMS 104) may pass through the parent server 114, which may be considered as part of the network infrastructure (e.g., network 116) between the secure enclave 111 and the external system. According to examples, the party hosting the secure enclave 111 (e.g., the service provider) may not access users' secret keys stored or used within the secure enclave 111. According to examples, the KMS 104 may be bound to the secure enclave 111 and configured to securely store cryptographic materials outside the secure enclave 111.

In examples, the client application 110 shares highly sensitive data with the KE service 108, thus requiring confidentiality or authenticity/integrity in transit. Accordingly, the secure enclave 111 may be configured to build a secure channel 113 and to communicate with the client application 110 via the secure channel 113. For example, the client application 110 may authenticate itself to an IdP (e.g., the IAM system 106) and receive a proof of authentication. In some examples, as a trusted party, the IdP provider (e.g., IAM system 106) may store the means to authenticate users based on a password, which may typically be stored via a hash of the user's password. The user password may be sent using HTTPS to the IAM system 106 where it is hashed and compared against the stored hash. Subsequent to verifying the user's password, the IAM system 106 may provide, to the client application 110, a proof of authentication signed with the IDP certificate.

The proof of authentication may be provided to the KE service 108 to retrieve the user's secret key for user data. A person or process that may gain access to this proof of authentication may be able to impersonate the user. As such, the proof of authentication must be considered as sensitive. In examples where the KE service 108 is hosted by a third party (e.g., the service provider), the secure channel 113 may be configured to enable the secure enclave 111 to read the proof of authentication, not the third party (e.g., parent server 114 or another server). Moreover, after the KE service 108 validates the identity of the user, the user's secret key is sent from the KE service 108 to the client application 110 via the secure channel 113. Accordingly, the secure channel 113 may be configured to enable only the client application 110 and the secure enclave 111 to read the user's secret key and not another person or process.

In some examples, to build a secure channel 113 between the secure enclave 111 and a client, present systems and methods leverage a secure enclave attestation. The secure enclave attestation may include a cryptographic signature associated with an identity of the secure enclave 111 that is trusted as coming from the declared secure enclave 111. Accordingly, the client can process an exchange of cryptographic primitives (also referred to as a handshake) to build the secure channel 113 between itself and the secure enclave 111. In this manner, the user may be guaranteed that everything sent or received through the secure channel 113 can be read only by the authorized client or the secure enclave 111. In some examples, before a first communication between the secure enclave 111 and a client, (e.g., the KMS 104, the client application 110), the client may be provided with information (e.g., a certificate authority (CA) certificate) associated with the secure enclave 111 that can be used to authenticate the secure enclave 111. For example, the secure enclave 111 may generate and provide a cryptographic attestation to the client in order to build a chain of trust. In some examples, the secure enclave 111 may be configured to provide proof of what code it runs. For example, the secure enclave 111 may generate cryptographic attestation with some measurement values of the code running within the secure enclave 111 or its environment. According to examples, the attestation is signed by a certificate embedded by the client application 110, where the certificate may be the certificate of the service provider or from the chain of trust provided by the secure enclave 111.

In some examples, the measurement values may include a fingerprint of data that may be generally computed with a hash function. The chain of trust may enable the client providing sensitive data to the secure enclave 111 to trust the code processing its data.

According to examples, the secure enclave 111 may be configured to request the KMS 104 to decrypt data with a key stored by the KMS 104. To authenticate the requesting secure enclave 111, the KMS 104 may verify cryptographic attestation provided by the secure enclave 111 using the information previously provided (e.g., the CA certificate).

Upon successful authentication, the KMS 104 may decrypt the data using the stored key. According to an example, to securely send the data to the secure enclave 111, the KMS 104 may retrieve trusted cryptographic primitives (e.g., a public key of the secure enclave 111 included in the cryptographic attestation) and re-encrypt the data using the trusted cryptographic primitives. The KMS 104 may then send the re-encrypted data in a response to the secure enclave 111. The secure enclave 111 may receive and decrypt the response with a private key to access the data.

As can be appreciated, access to the cryptographic materials stored in the KMS 104 is highly sensitive, where an entity with access to the "Decrypt" function of the KMS 104 with the cryptographic materials can recover every users' secret key, and thus may also decrypt the users' encrypted user data (e.g., their vaults). According to examples, the KMS 104 may grant or deny access to its functions with a given key based on a list of policies. The "Decrypt" function may be considered particularly sensitive, where access to the "Decrypt" function for the stored key in the KMS 104 may only be granted to trusted secure enclaves 111. In some examples, to enforce such access, the policies may be based on conditions about one or a combination of: the code the secure enclave 111 runs, the environment where the secure enclave 111 is deployed, or the source of the secure enclave 111. These conditions may be verified with the cryptographic attestation of the secure enclave 111 by the KMS 104 before granting access. As can be appreciated, the integrity of this set of access policies to the stored key needs to be protected. Access rights to update policies may be delegated following a least privileges principle. In some examples, changes to the set of policies may be monitored, where changes may cause an alert to be raised. In some examples, disabling the monitoring may also raise an alert.

The user computing device 102, for example, may be a mobile computing device, a tablet computing device, a laptop computing device, a desktop computing device, or a personal computing device, among other types of computing devices. While only one user computing device 102 is illustrated in the example system 100, any number of user devices may be used according to aspects disclosed herein. The parent server 114 may be a computing device, including, but not limited to, a desktop computing device, a server computing device, or a distributed computing device, among other types of computing devices. In an example, the IAM system 106 may be configured to operate on any of a variety of computing devices according to aspects disclosed herein. The user computing device 102, parent server 114, and IAM system 106 may be communicatively connected using one or a combination of networks 116 (e.g., a local-area network, a wide-area network, the Internet, among other networks). While each of user computing device 102, parent server 114, and IAM system 106 is illustrated as one element in system 100, it will be appreciated that any number of computing devices may be used to provide the functionality discussed herein.

Figure 2:
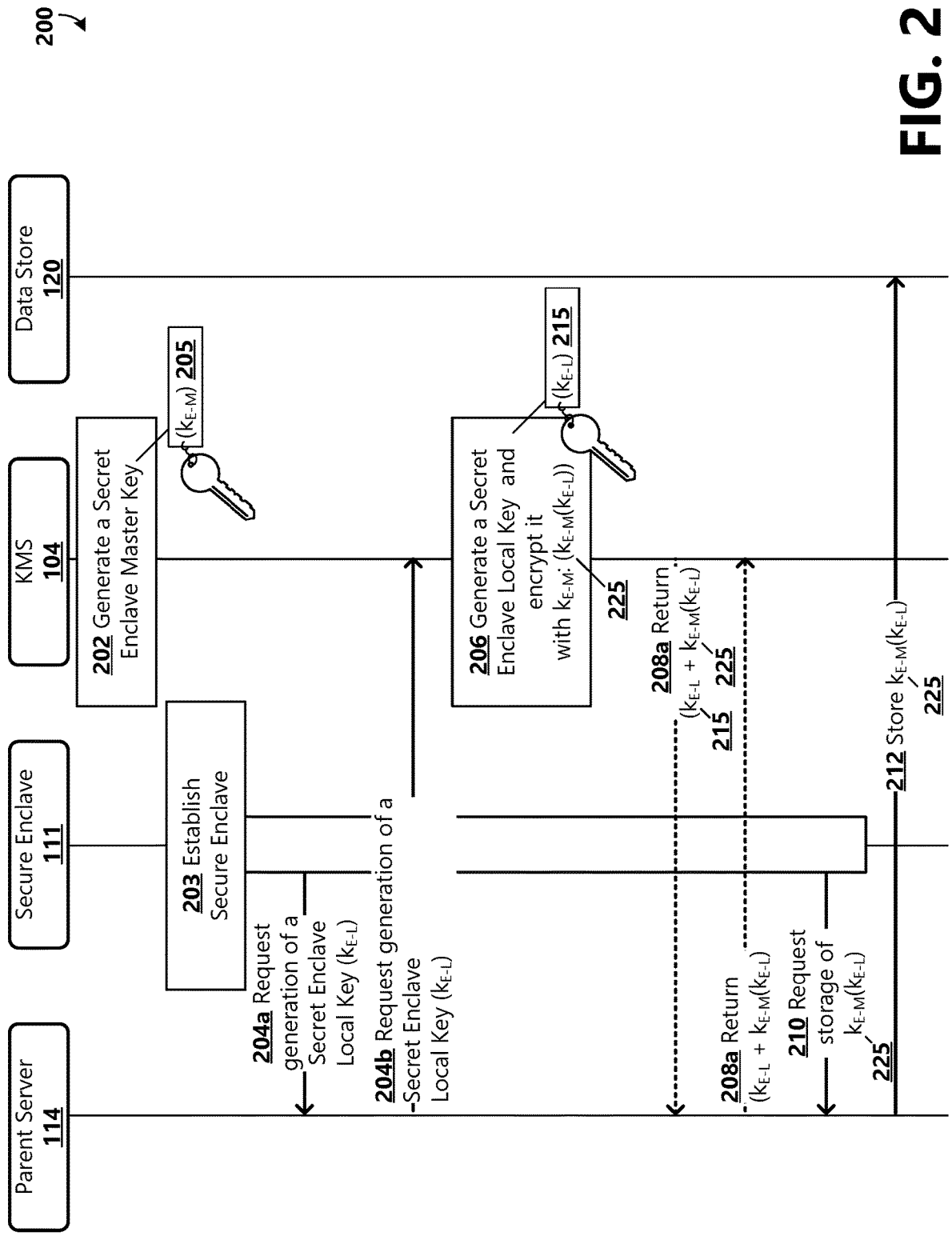
FIG. 2 illustrates a method for initializing the KE service according to an example.

With reference now to FIG. 2, a nonexclusive example method for initializing the KE service 108 is illustrated. As shown, at operation 202, a secret enclave master key ($k_{E-M}$) 205 may be generated by the KMS 104 and access policies to the enclave master key ($k_{E-M}$) 205 may be built to allow access to be granted only to the secure enclave 111. In some examples, building the access policies to the secure enclave 111 may include basing policies on information provided by the attestation of the secure enclave 111. For instance, when the KMS 104 receives a request for the enclave master key ($k_{E-M}$) 205, the KMS 104 may be configured to match the attestation provided with the policies to grant or deny the request.

At operation 203, the secure enclave 111 may be established using secure enclave technologies, and at operations 204a-204b, the secure enclave 111 may request, via the parent server 114, generation of a secret enclave local key ($k_{E-L}$) 215. At operation 206, the KMS 104 may generate the secret enclave local key ($k_{E-L}$) 215 and, at operations 208a-208b, securely send (as previously described) two versions of the secret enclave local key ($k_{E-L}$) 215 to the secure enclave 111. One version of the secret enclave local key ($k_{E-L}$) 215 may be encrypted by the secret enclave master key ($k_{E-M}$) 205 (sometimes referred to as encrypted enclave local key ($k_{E-M}(k_{E-L})$) 225). The second version of the secret enclave local key ($k_{E-L}$) 215 may be plaintext or encrypted only for the secure enclave 111 (e.g., via a public key of the secure enclave 111). In some examples, the secure enclave 111 may receive and decrypt the response with a private key to access the enclave local key ($k_{E-L}$) 215.

At operation 210, the secure enclave 111 may request storage of its encrypted local key. For example, the secure enclave 111 may request the parent server 114 to store the encrypted enclave local key ($k_{E-M}(k_{E-L})$) 225, which the parent server 114 may store in a data store 120. The data store 120, for example, may comprise a storage device (e.g., computer memory, a hard drive, a flash drive, etc.), a database, or a file server, among other data stores. In examples, the data store 120 may include a standard database. In some examples, the secure enclave 111 may further keep, in volatile memory, the plaintext enclave local key ($k_{E-L}$) 215. Accordingly, if the secure enclave 111 is rebooted or a new instance of the secure enclave 111 is deployed, the new instance of the secure enclave 111 may be enabled to recover the enclave local key ($k_{E-L}$) 215.

Figure 3:
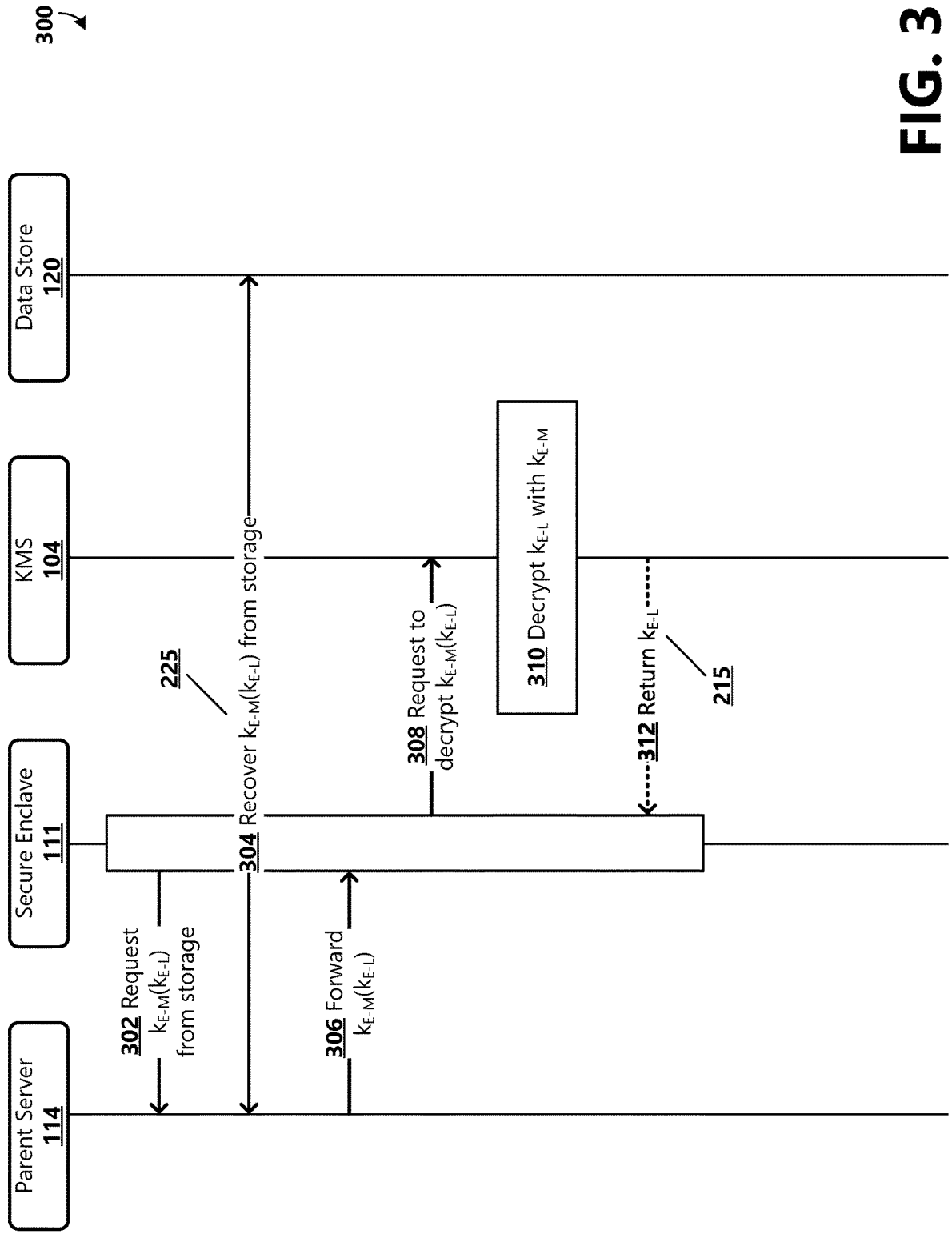
FIG. 3 illustrates a method for reinitializing the secure enclave according to an example.

For example, and with reference now to FIG. 3, a nonexclusive example method for recovering the enclave local key ($k_{E-L}$) 215 is illustrated. At operation 302, the secure enclave 111 may request the stored encrypted enclave local key ($k_{E-M}(k_{E-L})$) 225 from the parent server 114. The parent server 114, may recover the encrypted enclave local key ($k_{E-M}(k_{E-L})$) 225 from storage at operation 304, and forward the encrypted enclave local key ($k_{E-M}(k_{E-L})$) 225 to the secure enclave 111 at operation 306. At operation 308, the secure enclave 111 may request the KMS 104 to decrypt the encrypted enclave local key ($k_{E-M}(k_{E-L})$) 225. The KMS 104 may decrypt the encrypted enclave local key ($k_{E-M}(k_{E-L})$) 225 with the enclave master key ($k_{E-M}$) 205 at operation 310, and return the enclave local key ($k_{E-L}$) 215 to the secure enclave 111 at operation 312 (as previously described), wherein the plaintext secret enclave local key ($k_{E-L}$) 215 is never in plaintext outside a secured environment (e.g., the secure enclave 111 or the KMS 104).

Figure 4A:
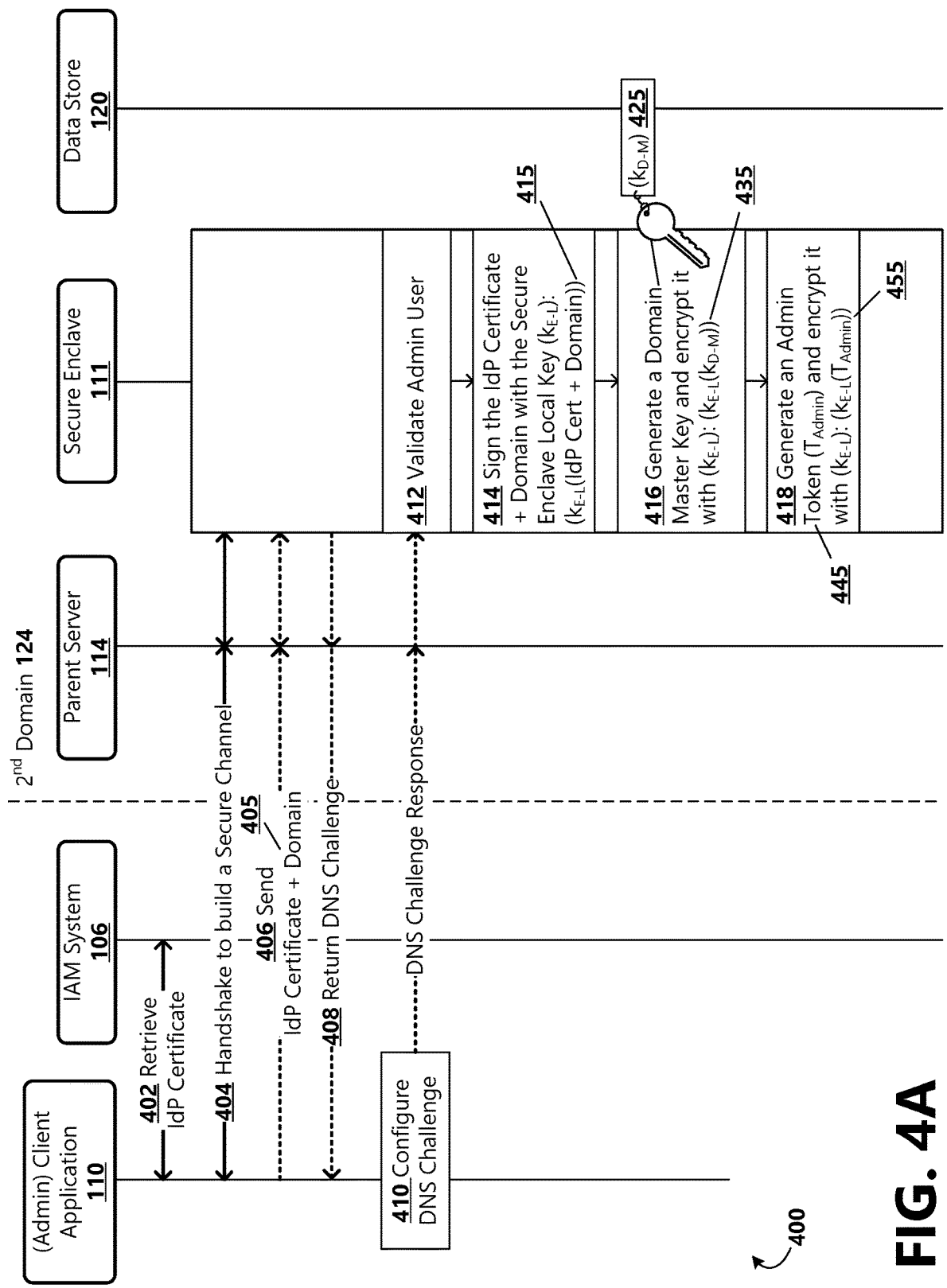
FIGS. 4A and 4B, illustrate a method for initializing the KE service for SSO for a first domain according to an example.
Figure 4B:
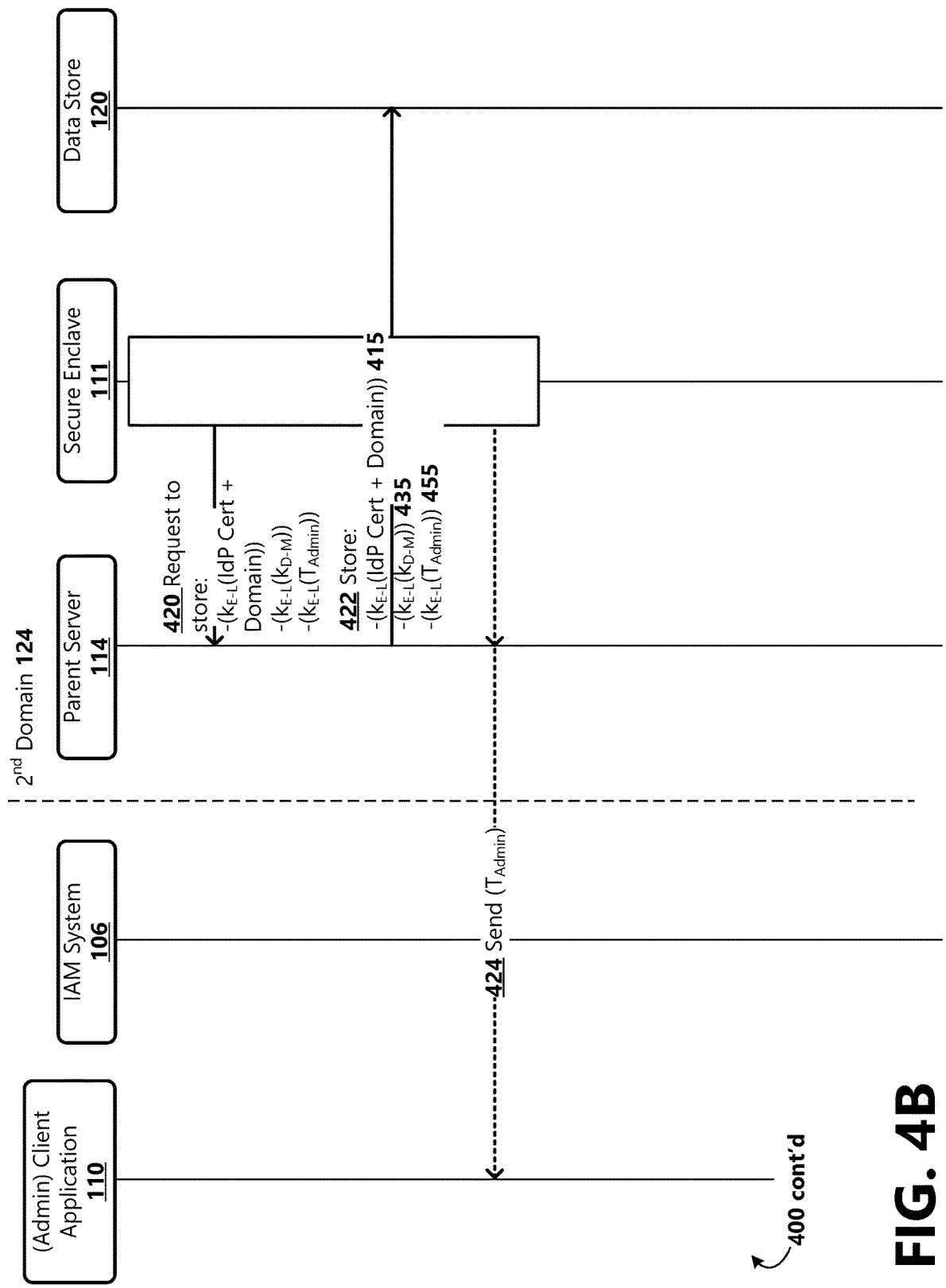

According to examples, an initial provisioning operation that may be performed as part of configuring SSO and SCIM for the KE service 108 using the IAM system 106 as the IdP. With reference now to FIGS. 4A and 4B, a nonexclusive example of an initial provisioning method 400 is illustrated. In the example depicted in FIGS. 4A and 4B, the client application 110 may be illustrative of an administrative client application, where the user of the administrative client application 110 may be an IT administrative user of the enterprise. At operation 402, the IdP may be configured. For example, the administrative user may select an SSO system (e.g., an IAM system 106) as the IdP. The administrative client application 110 may retrieve, from the IAM system 106, a Uniform Resource Locator (URL) for the IAM system 106 (including the domain name of the first domain 122) and an IdP certificate (sometimes referred to herein as IdP Certificate+Domain 405) associated with a key that will be used to sign further users' proof of authentication.

At operation 404, a handshake may be performed between the administrative client application 110 and the secure enclave 111 to build a secure channel 113. For example, at operation 406 the administrative client application 110 may send the IdP Certificate+Domain 405 to the parent server 114, which forwards the IdP Certificate+Domain 405 to the secure enclave 111 via the secure channel 113 to protect the IdP certificate integrity (e.g., to prevent the IdP certificate from being replaced in transit by a rogue certificate).

In some examples, the secure enclave 111 may use the IdP certificate to verify attestation for authenticating users of the enterprise's domain. Thus, the secure enclave 111 may be configured to verify the administrative user performing the initial provisioning operation is an authorized user/owner of the first domain 122. In examples, this may prevent a user from providing a rogue IdP certificate for a domain in which they are not authorized as an authorized user/owner. In some examples, SSO may be based on the domain of the email address of the user. For instance, if the user requests to login with the username: user@example.com, and the domain "example.com" is linked to the IAM system 106, the client application 110 may be directed to authenticate with the IAM system 106. As can be appreciated, registration of the IAM system 106 as an IdP of the first domain 122 is a sensitive operation. Accordingly, the KE service 108 may be configured to perform domain verification.

At operation 408, the secure enclave 111 may send back a random value to the administrative client application 110 to initiate a verification of the first domain 122. For example, a domain name system (DNS) challenge may be performed at operation 410 (e.g., between the administrative user may and the secure enclave 111) to prove the administrative user controls the DNS for the domain name. The DNS challenge may enable the secure enclave 111 to ensure that it is communicating with an owner of the claimed domain (e.g., first domain 122). In some examples, the administrative user may be required to place the random value at the root of the domain. The secure enclave 111 can check this value with DNS (e.g., using a secured version of the DNS protocol). In this way, the secure enclave 111 may validate that the administrative user is an owner of the claimed domain.

Upon validating the administrative user at operation 412, the secure enclave 111 may sign the IdP Certificate+Domain 405 with the secret enclave local key ($k_{E-L}$) 215 at operation 414. This signed certificate and domain may be referred to sometimes herein as a signed IdP Certificate+Domain ($k_{E-L}$(IdP Cert+Domain)) 415.

At operation 416, the secure enclave 111 may further generate a master key for the domain (herein referred to as a domain master key ($k_{D-M}$) 425. The secure enclave 111 may further encrypt the domain master key ($k_{D-M}$) 425 with the enclave local key ($k_{E-L}$) 215. This encrypted key may be referred to sometimes herein as an encrypted domain master key ($k_{E-L}(k_{D-M})$) 435.

At operation 418, an admin token ($T_{admin}$) 445 may be generated by the secure enclave 111 and encrypted. For example, the secure enclave 111 may encrypt the admin token ($T_{admin}$) 445 using the enclave local key ($k_{E-L}$) 215. This encrypted key may be referred to sometimes herein as an encrypted admin token ($k_{E-L}(T_{admin})$) 455. The admin token ($T_{admin}$) 445 may be used to authenticate administrative users of the first domain 122 for future administrative operations, so that the administrator does not have to perform the domain verification each time. In some examples, the admin token ($T_{admin}$) 445 may be shared between admin accounts of the first domain 122.

With reference now to FIG. 4B, the example method 400 continues to operation 420, where a request may be sent from the secure enclave 111 to the parent server 114 to store the signed IdP Certificate+Domain ($k_{E-L}$(IdP Cert+Domain)) 415, the encrypted domain master key ($k_{E-L}(k_{D-M})$) 435, and the encrypted admin token ($k_{E-L}(T_{admin})$) 455.

At operation 422, the parent server 114 may store the signed IdP Certificate+Domain ($k_{E-L}$(IdP Cert+Domain)) 415, the encrypted domain master key ($k_{E-L}(k_{D-M})$) 435, and the encrypted admin token ($k_{E-L}(T_{admin})$) 455 in the data store 120. According to examples, the parent server 114 may further send the admin token ($T_{admin}$) 445 to the administrative client application 110 at operation 424 through the secure channel 113. At the end of the depicted example workflow, the KE service 108 may be provided with the IdP certificate for the domain (IdP Cert+Domain) 405 in order to verify proof of authentication from users as being signed by the legitimate IdP. Moreover, the KE service 108 may be provided with the domain master key ($k_{D-M}$) 425 to encrypt users' secret keys for the first domain 122. Those of skill in the art will recognize that in the above-depicted flow, all cryptographic operations are not detailed for simplification of examples. For example, when discussing cryptographic operations performed with primitives, such operations may include one or more additional specific operation(s) to perform the actions (e.g., key derivation operation(s) before encrypting or signing, authenticated encryption with associated data, etc.).

According to examples, after configuring the IAM system 106 as the IdP for the KE service 108, such as described above with reference to FIGS. 4A and 4B, users associated with the first domain 122 may be enabled to log into the client application 110 of the user data service 109 using an SSO flow. As an example, the client application 110 may be configured to redirect a user from a login page of the client application 110 to a login page of the IAM system 106 configured as the user's IdP (e.g., an SSO login page). The user may login using their SSO credentials. Upon authentication of the user, the IAM system 106 may redirect the user back to the client application 110 with the IdP's proof of authentication (e.g., IdP certificate). The client application 110 may send the IdP's proof of authentication to the KE service 108 to retrieve the user's secret key. According to examples, the user's secret key may be used by the client application 110 to decrypt user data (e.g., stored in the user data store 112 and/or in a local user data store 118). According to examples, until the sending of the proof of authentication, the flow may be the same for users performing their first login and users who have already their account(s) enabled.

Figure 5A:
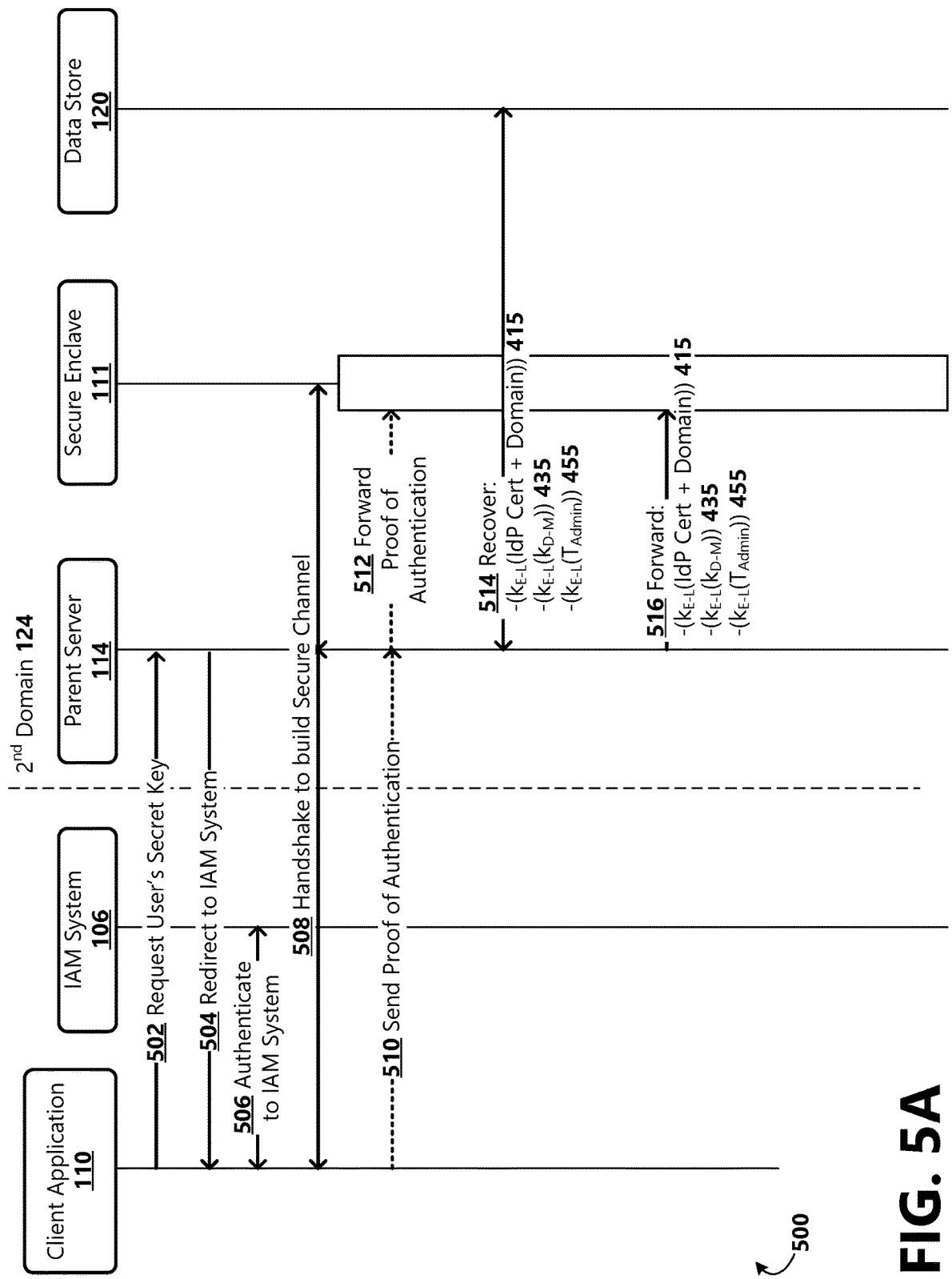
FIGS. 5A and 5B illustrate a method for logging a user of the first domain into a client application of a service provider managing the KE service using an IAM system according to an example.
Figure 5B:
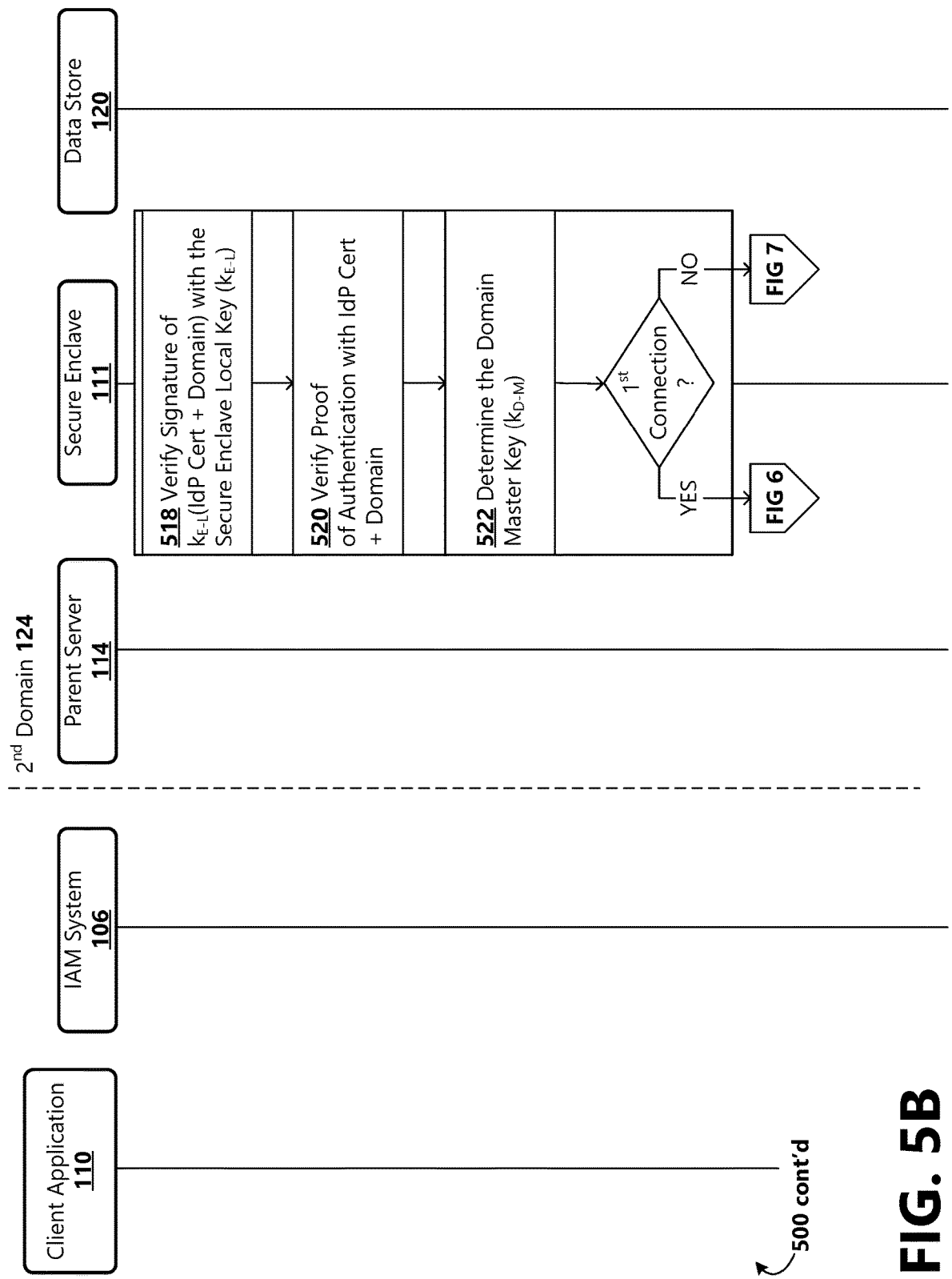

With reference now to FIGS. 5A and 5B, a nonexclusive example method of logging into the client application 110 using the IAM system 106 is illustrated. The example method 500 may start upon receiving an indication of a user accessing the client application 110. For example, at operation 502, a request for the user's secret key may be sent from the client application 110 to the parent server 114. At operation 504, the parent server 114 may redirect the client application 110 to the IAM system 106, where the IAM system 106 may provide an SSO login page for authenticating the user.

At operation 506, the user may authenticate to the IAM system 106 (e.g., provide credentials proving the user's identity), whereupon the IAM system may return proof of authentication to the client application 110. In some examples, the Security Assertion Markup Language (SAML) protocol may be used. Thus, in some examples, the proof of authentication may include a SAML assertion signed by the IdP 106.

At operation 508, a secure channel 113 may be built between the client application 110 and the secure enclave 111 as described above, for example. At operation 510, the proof of authentication may be encrypted by the client application 110 and then sent to the parent server 114. According to examples, the parent server 114 may not be able to read or modify the proof of authentication and may forward the traffic of the secure channel 113 to the secure enclave 111 at operation 512.

At operation 514, elements linked to the domain of the user may be retrieved from the data store 120 by the parent server 114. For example, the parent server 114 may retrieve: the signed IdP Certificate+Domain ($k_{E-L}$(IdP Cert+Domain)) 415, the encrypted domain master key ($k_{E-L}(k_{D-M})$) 435, and the encrypted admin token ($k_{E-L}(T_{admin})$) 455. The parent server 114 may then forward the elements linked to the user's domain to the secure enclave 111 at operation 516.

The example method 500 may continue to operation 518 shown in FIG. 5B. At operation 518, the signature of the signed IdP Certificate+Domain ($k_{E-L}$(IdP Cert+Domain)) 415 may be verified using the enclave local key ($k_{E-L}$) 215. In examples, verification of the IdP signature at operation 518 may help to prevent the IdP certificate 405 provided in the initial provisioning from being replaced at rest by a rogue certificate.

At operation 520, the proof of authentication may be verified. For example, the secure enclave 111 may use the IdP certificate 405 associated with the first domain 122 to verify proof of authentication from the user as being signed by the legitimate IdP. For example, as a result, the user may be authenticated in the secure enclave 111. Upon the user being authenticated, the domain master key ($k_{D-M}$) 425 may be decrypted. A determination may then be made based on whether this is a first connection or an already-enabled account. In examples, the example method 500 may then either continue to method 600, where the user's secret key may be generated in association with a first connection with the KE service 108, or may continue to method 700, where the user's secret key may be retrieved in a subsequent connection with the KE service 108. Divergent nonexclusive example method flows 600, 700 are depicted in FIGS. 6 and 7.

Figure 6:
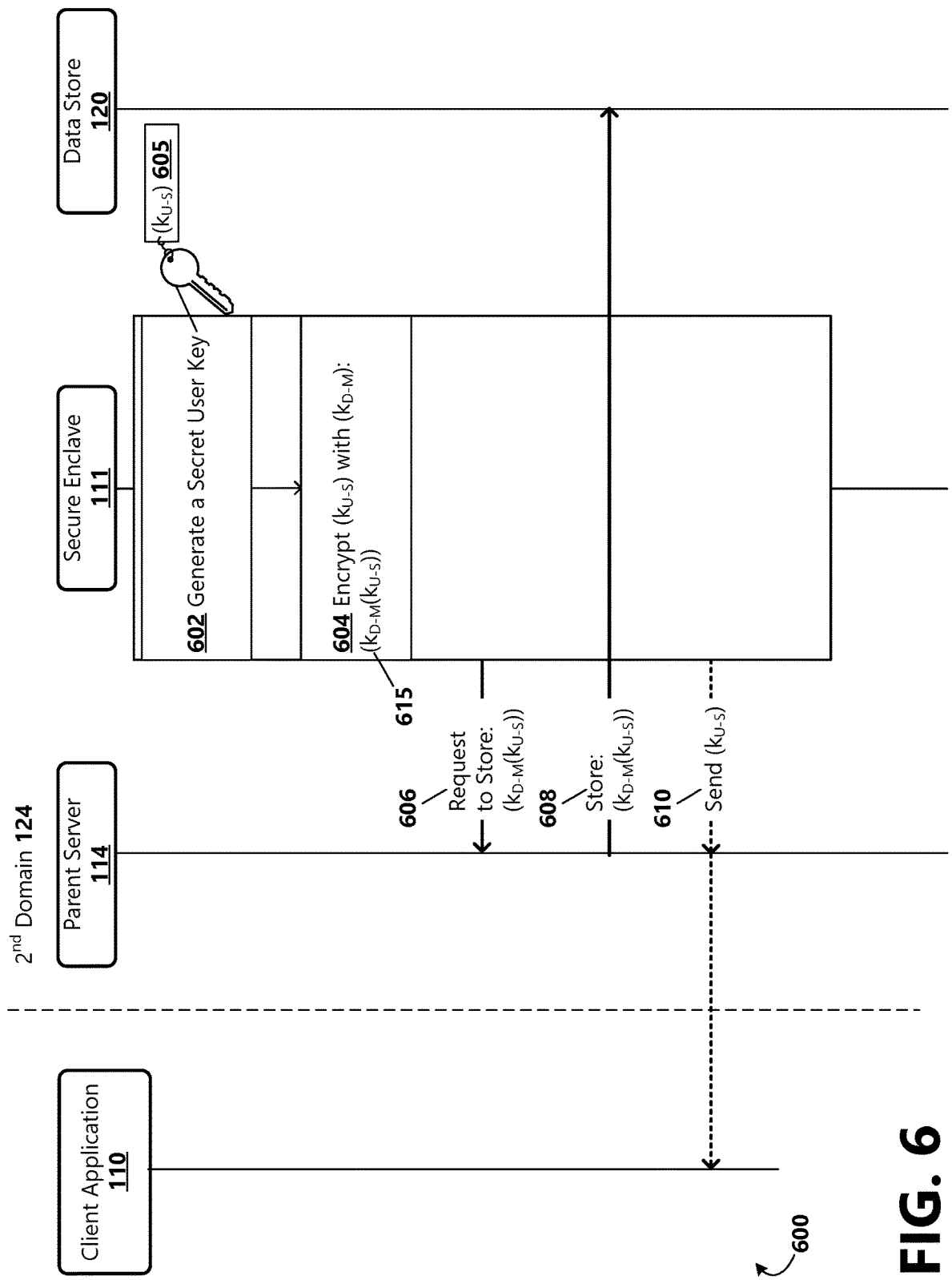
FIG. 6 illustrates a method for generating a user's secret key in association with a first connection with the KE service according to an example.

With reference now to FIG. 6, the example method 600 may start at operation 602, where after the user is authenticated (the signature of the user's proof of authentication is verified), the user's secret key ($k_{U-S}$) 605 may be generated by the secure enclave 111. At operation 604, the user's secret key ($k_{U-S}$) 605 may be encrypted with the domain master key ($k_{D-M}$) 425.

At operation 606, a request may be made to the parent server 114 to store the encrypted user secret key ($k_{D-M}(k_{U-S})$) 615, and at operation 608, the parent server 114 may store the encrypted user secret key ($k_{D-M}(k_{U-S})$) 615 in the data store 120. In some examples, after receiving confirmation that the encrypted user secret key ($k_{D-M}(k_{U-S})$) 615 is stored, the secure enclave 111 may send, to the client application 110, the user's secret key ($k_{U-S}$) 605 encrypted in the secure channel 113.

Figure 7:
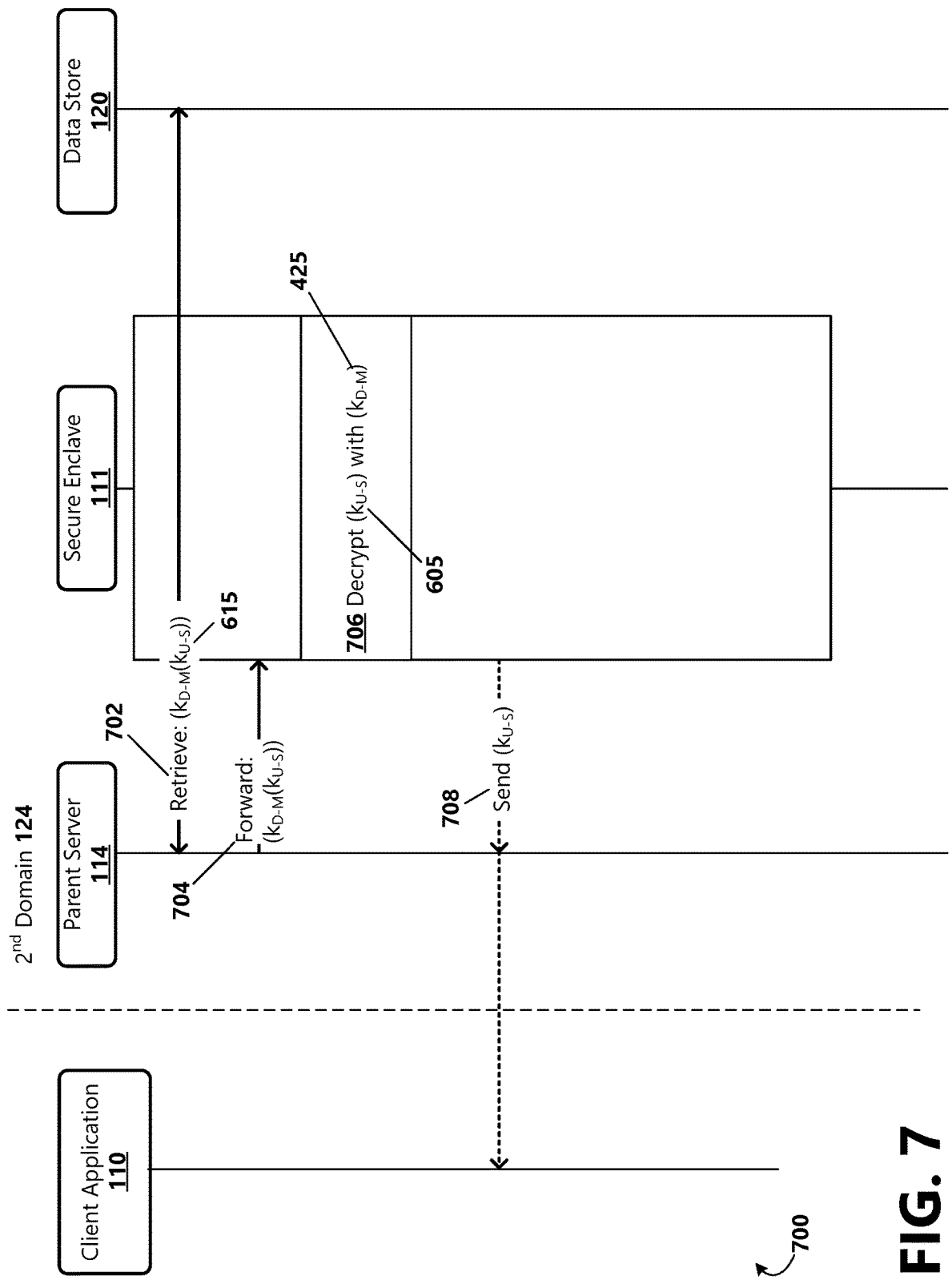
FIG. 7 illustrates a method for retrieving a user's secret key in association with a subsequent connection with the KE service according to an example.

With reference now to FIG. 7, the example method 700 may start at operation 702, where after the user is authenticated (the signature of the user's proof of authentication is verified), stored elements associated with the user may be retrieved by the parent server 114. For example, the stored elements may include the encrypted user secret key ($k_{D-M}(k_{U-S})$) 615 (e.g., the user's secret key 605 encrypted with the domain master key ($k_{D-M}$) 425).

At operation 704, the parent server 114 may forward the stored elements to the secure enclave 111, and at operation 706, the secure enclave 111 may decrypt the user's secret key 605 with the domain master key ($k_{D-M}$) 425. According to examples, at operation 708, the secure enclave 111 may then send the user's secret key ($k_{U-S}$) 605 to the client application 110 encrypted in the secure channel 113. Those of skill in the art will recognize that the diagrams provided herein are not exhaustive and other operations not depicted may be included. Moreover, various operations may be performed out of the order depicted.

In examples, the KE service 108 may be further configured to perform user and group management through the SCIM protocol. For example, the SCIM protocol may define a format of a request that the IAM system 106 should follow to provision users and groups into a service provider and define the endpoint path for the request. According to examples, access to a SCIM flow grants privileges to manage users and groups for the enterprise. As such, access to the SCIM flow may be considered as highly sensitive. Additionally, managing users and groups require cryptographic keys that, if managed by the service provider, would violate the zero-knowledge architecture, similarly to how user's secret keys would. This way, the security consideration for the KE service 108 may be applied to a SCIM endpoint. According to an example implementation, the request from the IAM system 106 may be authenticated with a bearer token to be trusted and accepted. In examples, if the token is eavesdropped, an eavesdropper could forge a request to add the eavesdropper to some groups of the enterprise and then gain access to some user secrets. This is the same in the case of a zero-knowledge architecture. Accordingly, examples may prevent a third-party hosting the SCIM endpoint (e.g., the KE service 108) from eavesdropping the bearer token.

According to examples, the SCIM standard may define a client role in the SCIM flow, which may be configured as the IAM system 106. As such, any mechanism to protect the SCIM flow cannot require control of the client (i.e., the IAM system 106). Rather, examples of the present systems and methods utilize the HTTPS protocol to directly terminate into the secure enclave 111. This way, the SCIM request from the IAM system 106 may be decrypted inside the secure enclave 111 and, as described for the SSO flow, cannot be eavesdropped on the parent server 114.

Moreover, in examples, user and group events need to be trusted as coming from a legitimate source before provisioning the user or group. Accordingly, the KE service 108 may be provided with a key to sign user and group events (sometimes referred to herein as a domain signature key ($k_{D-Sig}$). This way, a member of the first domain 122 can verify user and group events as coming from the KE service 108 (and, thus, from the IAM system 106). In examples, in order to enable SCIM provisioning, the bearer token and the domain signature key ($k_{D-Sig}$) for the first domain 122 may be provided. Present systems and methods protect the domain signature key ($k_{D-Sig}$) and bearer token using the secure enclave 111.

Figure 8:
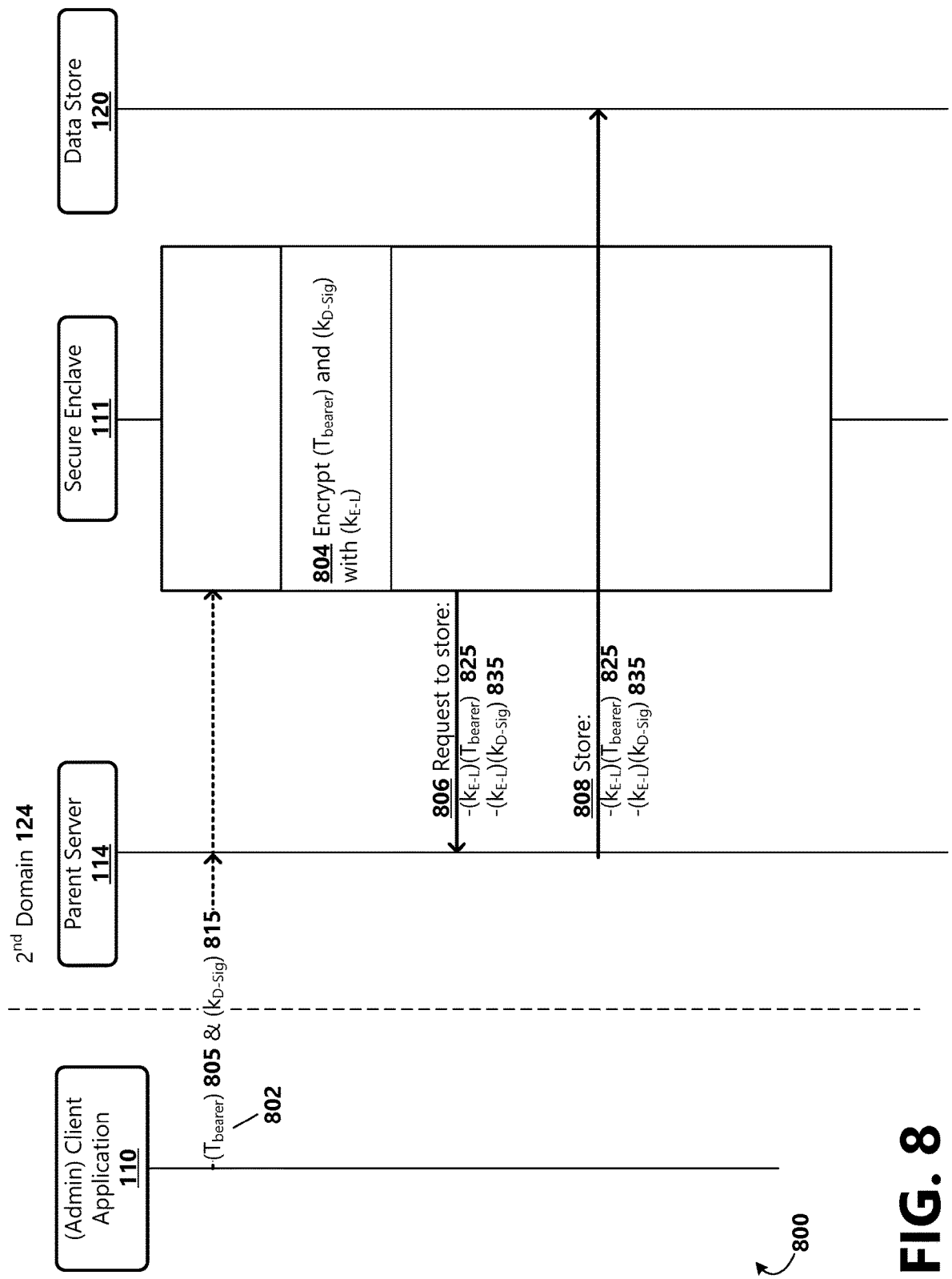
FIG. 8 illustrates a method for configuring the KE service as a SCIM endpoint according to an example.

According to examples, and with reference now to FIG. 8, a non-limiting example method 800 of provisioning the KE service 108 as a SCIM endpoint is provided. In the example depicted in FIG. 8, the client application 110 may be illustrative of an administrative client application, where the user of the administrative client application 110 may be an IT administrative user of the enterprise. According to examples, the administrative client application 110 may generate a set of keys for SCIM including a bearer token ($T_{bearer}$) 805 and a domain signature key ($k_{D-Sig}$) 815. At operation 802, the bearer token ($T_{bearer}$) 805 and the domain signature key ($k_{D-Sig}$) 815 may be sent to the secure enclave 111 through the secure channel 113. For example, the secure channel 113 may already be established and the administrative user of the administrative client application 110 may be authenticated (e.g., via a DNS challenge or the admin token ($T_{admin}$) 445).

At operation 804, the bearer token ($T_{bearer}$) 805 and the domain signature key ($k_{D-Sig}$) 815 may be encrypted by the secure enclave 111 with the enclave local key ($k_{E-L}$) 215, and at operation 806, a request may be made to the parent server 114 to store the encrypted bearer token ($k_{E-L}$)($T_{bearer}$) 825 and the encrypted domain signature key ($k_{E-L}$)($k_{D-Sig}$) 835. At operation 808, the encrypted bearer token ($k_{E-L}$)($T_{bearer}$) 825 and the encrypted domain signature key ($k_{E-L}$)($k_{D-Sig}$) 835 may be sent to the data store 120 by the parent server 114 to be stored. According to examples, the domain signature key ($k_{D-Sig}$) and the bearer token may be protected by the secure enclave 111, and the secure enclave 111 may be ready to receive SCIM requests from an SCIM client (e.g., the IAM system 106).

Figure 9:
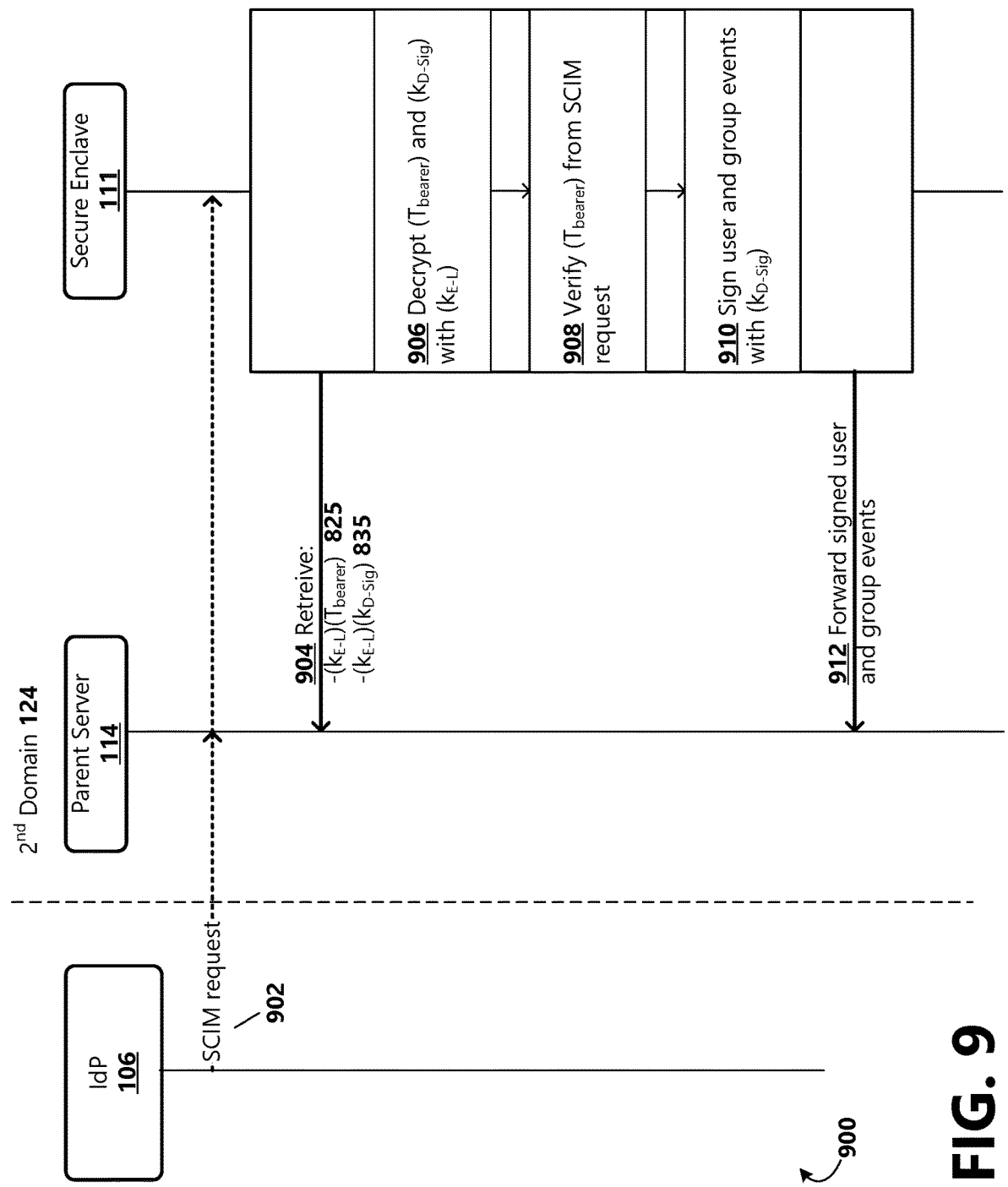
FIG. 9 illustrates a method of a SCIM flow including the KE service according to an example.

With reference now to FIG. 9, a nonexclusive example method 900 of a SCIM flow including the KE service 108 is depicted. According to examples, the method 900 may start at operation 902, where a SCIM request may be received from the IAM system 106. For example, the request may be an HTTPS request, and the parent server 114 may include a Transmission Control Protocol (TCP) socket configured to receive the request and forward the traffic (e.g., L4 packets) to the secure enclave 111. In examples, before sending the HTTP request, the IAM system 106 may perform a TLS handshake defined in the TLS protocol to build the HTTPS connection. In an example, the handshake may start with authenticating the secure enclave 111 using its x509 certificate. In examples, the certificate may be issued by a CA, where the IdP 106 trusts the CA for delivering a certificate after authenticating the secure enclave 111 with the enclave attestation. Thus, the attestation of the secure enclave 111 may be verified by the IAM system 106 so that the IAM system 106 may be ensured it is starting a connection with the secure enclave 111.

At operation 904, a request may be sent from the secure enclave 111 to the parent server 114 for the encrypted bearer token $(k_{E-L})(T_{bearer})$ 825 and the encrypted domain signature key $(k_{E-L})(k_{D-Sig})$ 835. The parent server 114 may recover and then forward the encrypted bearer token $(k_{E-L})$ $(T_{bearer})$ 825 and the encrypted domain signature key $(k_{E-L})(k_{D-Sig})$ 835 to the secure enclave 111.

At operation 906, the bearer token $(T_{bearer})$ 805 and the domain signature key $(k_{D-Sig})$ 815 may be decrypted with the secret enclave local key $(k_{E-L})$ 215. At operation 908, a bearer token included in the request from the IdP 106 may be verified using the decrypted bearer token $(T_{bearer})$ 805 from the data store 120.

If the verification succeeds, user and group events may be signed by the secure enclave 111 at operation 910 with the domain signature key $(k_{D-Sig})$ 815. In some examples, signed user and group events may be sent to the parent server 114 at operation 912. According to examples, the parent server 114 may be configured to forward the signed events to another API endpoint. According to examples, when an event is signed by a key owned by the secure enclave 111 (e.g., the domain signature key $(k_{D-Sig})$ 815), the event may be trusted by the API endpoint as a legitimate event coming from the IAM system 106 of the first domain 122.

According to examples, the IdP (e.g., IAM system 106) may be granted capabilities that may be typically reserved for an account administrator. Accordingly, in some examples, aspects may include other use cases that typically require a human account administrator to make changes to provide secure automated administrator capabilities. For example, the secure enclave 111 may be configured as an administrator from an authorization perspective.

Figure 10:
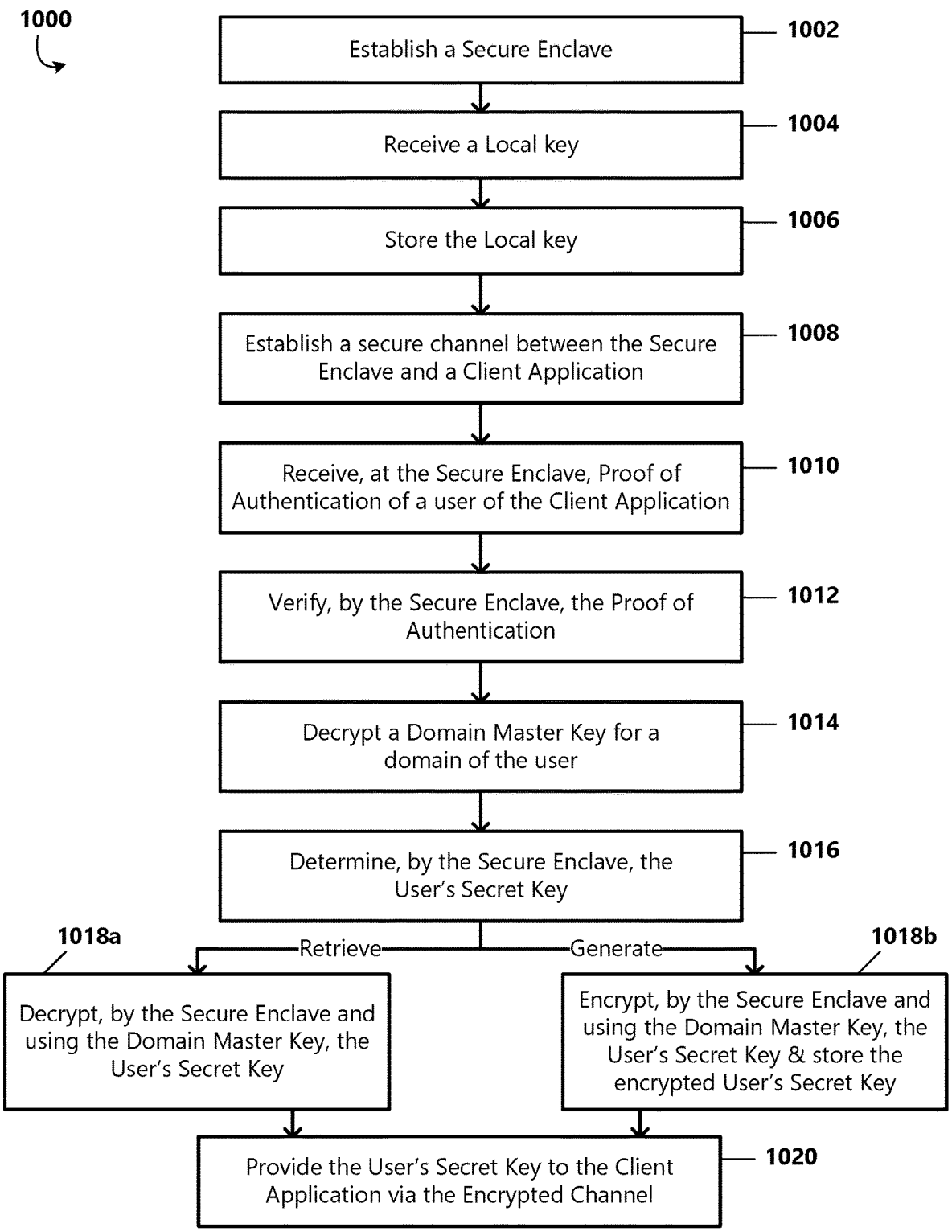
FIG. 10 illustrates a method for protecting user data according to an example.

With reference now to FIG. 10, a method 1000 for protecting user data according to an example is illustrated. For example, user data may be protected using a KE service 108 and a user data service 109. At operation 1002, a secure enclave 111 may be established on a parent server 114. As described above, the secure enclave 111 may be isolated from the rest of the parent server 114 to create the secure/trusted environment.

At operation 1004, a secret local key associated with the secure enclave 111 may be received. For example, the secure enclave 111 may be bound to a KMS 104, which may generate a master key for the secure enclave 111 (e.g., secure enclave master key $(k_{E-M})$ 205 and the secure enclave local key $(k_{E-L})$ 215). In some examples, at operation 1004, the secure enclave 111 may receive the secure enclave local key $(k_{E-L})$ 215 and an encrypted enclave local key $(k_{E-M}(k_{E-L}))$ 225 (e.g., the secure enclave local key $(k_{E-L})$ 215 encrypted by the secure enclave master key $(k_{E-M})$ 205).

At operation 1006, the encrypted enclave local key $(k_{E-M}(k_{E-L}))$ 225 may be stored. For example, the secure enclave 111 may request storage of the encrypted enclave local key $(k_{E-M}(k_{E-L}))$ 225 by the parent server 114 in the data store 120.

At operation 1008, a secure channel 113 may be established between the secure enclave 111 and a client application 110. In some examples, the client application 110 may be a client of the user data service 109. For example, a user of the client application 110 may wish to access the user's secret key $(k_{U-S})$ 605 to encrypt or decrypt user data. In some examples, building the secure channel 113 may include leveraging a secure enclave attestation including a cryptographic signature associated with an identity of the secure enclave 111 that is trusted as coming from the declared secure enclave 111. Accordingly, the client application 110 can process an exchange of cryptographic primitives (also referred to as a handshake) to build the secure channel 113 between the client application 110 and the secure enclave 111. In this manner, the user may be guaranteed that everything sent or received through the secure channel 113 can be read only by or come from the secure enclave 111.

At operation 1010, proof of authentication may be received at the secure enclave 111. For example, the client application 110 may be redirected by the parent server 114 to the IAM system 106 configured as the IdP for the first domain 122. According to an example, the IAM system 106 may include an SSO service, and an IdP Certificate+Domain 405 may have been previously received and signed by the secret enclave 111 using the secret enclave local key $(k_{E-L})$ 215. For example, a signed IdP Certificate+Domain $(k_{E-L}$ (IdP Cert+Domain)) 415 may be stored in the data store 120 by the parent server 114. After authenticating with the IAM system 106, proof of authentication may be provided and the client application 110 may be redirected back to the parent server 114. According to examples, the parent server 114 may be configured to forward the proof of authentication to the secure enclave 111 through the secure channel 113.

At operation 1012, the proof of authentication may be verified by the secure enclave 111. For example, the signed IdP Certificate+Domain $(k_{E-L}$(IdP Cert+Domain)) 415 may be retrieved from storage and used to verify the proof of authentication.

At operation 1014, upon verification of the proof of authentication, an encrypted domain master key $(k_{E-L}(k_{D-M}))$ 435 for the user's domain may be retrieved from the data store 120 by the parent server 114 and forwarded to the secure enclave 111. The encrypted domain master key $(k_{E-L}(k_{D-M}))$ 435 may then be decrypted by the secure enclave 111 using the secret enclave local key $(k_{E-L})$ 215. For example, the domain master key $(k_{D-M})$ 425 may be accessed by the secure enclave 111.

At operation 1016, the user's secret key may be determined. In some examples, the user's key may be retrieved from storage. For instance, the encrypted user secret key $(k_{D-M}(k_{U-S}))$ 615 may be retrieved from the data store 120 by the parent server 114 and forwarded to the secure enclave 111. The encrypted user secret key $(k_{D-M}(k_{U-S}))$ 615 may then be decrypted by the secure enclave 111 using the domain master key $(k_{D-M})$ 425 at operation 1018a. In other examples, the user's secret key $(k_{U-S})$ 605 may be generated by the secure enclave 111. At operation 1018b, the user's secret key $(k_{U-S})$ 605 may be encrypted with the domain master key $(k_{D-M})$ 425. Additionally, the secure enclave 111 may request the parent server 114 to store the encrypted user secret key $(k_{D-M}(k_{U-S}))$ 615 in the data store 120.

At operation 1020, the user's secret key ($k_{U-S}$) 605 may be sent to the client application 110 via the secure channel 113. For example, the client application 110 may use the user's secret key ($k_{U-S}$) 605 to encrypt user data (e.g., for storage of the user data by the user data service 109) or to decrypt user data stored by the data service 109.

In some examples, the secret enclave 111 may be configured to store encrypted user data, where the user data may not be decrypted by the client application 110, but may be decrypted on the fly by the secure enclave 111. For example, once the user has authenticated (e.g., via SSO), the decrypted application data may be transmitted to the client application 110 via the secure channel 113. As can be appreciated, other applications handling sensitive user data may be integrated with aspects of the present disclosure. Various technical advantages may result from the present example. For instance, data security may be improved by not storing user data locally (e.g. even encrypted.) Additionally, in the case where the data store 120 is compromised, not all data can be accessed because the user's secret key ($k_{U-S}$) 605 may not leave the secure enclave 111.

In some examples, a variety of authentication methods may be used, where some may not require the use of a master password. However, as mentioned above, zero-knowledge architectures generally depend on a master password to derive a decryption key. In some examples, a zero-knowledge architecture may be built without the use of a master password. For instance, a Hardware Security Module (HSM) key may be used for proof of identity, where once the user is authenticated, the secure enclave 111 may serve data over the secure tunnel 113 to the client application 110.

In some examples, aspects of the present disclosure may be implemented for providing emergency contact access to the primary user's data. For instance, one feature that is useful in many applications is an emergency contact—a person that can recover account information in a situation where the primary user may be unable to provide authentication details. According to examples, this may be achieved with zero-knowledge by encrypting the primary user's master password with an emergency contact public key and establishing rules regarding under which circumstances the emergency contact can access the primary user's user data.

In some examples, changing an account password may be performed on the client-side to maintain zero-knowledge. However, aspects of the present disclosure may be implemented for providing a password changing feature using the KE service 108. For instance, the password changing process may be handled in the secure enclave 111 according to examples.

Figure 11:
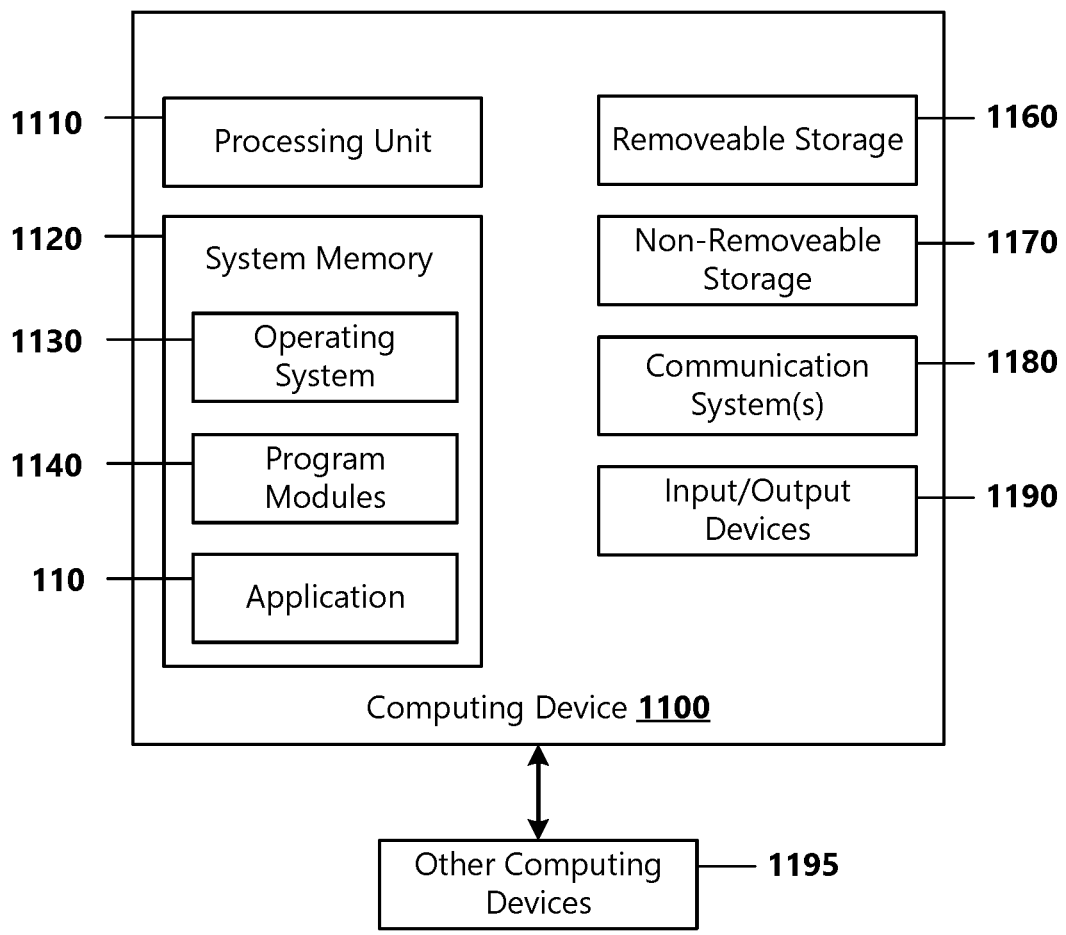
FIG. 11 is a block diagram of a computing device with which examples of the present disclosure may be practiced according to an example.

One or more aspects of the above-described systems and methods may be implemented on one or more computing systems. FIG. 11 is a block diagram illustrating physical components (i.e., hardware) of a computing device 1100 with which examples of the present disclosure may be practiced. The computing device components described below may be suitable for one or more computing device(s) implementing or comprising one or more of the client device 102 (hosting the client application 110), parent server 114, secure enclave 111, IAM system 106 operating as the IdP, storage device(s) 120, 112, 118, KMS 104, or any other computing systems discussed herein. As shown in FIG. 11, the physical components (e.g., hardware) of the computing device 1100 are illustrated and these physical components may be used to practice the various aspects of the present disclosure.

The computing device 1100 may include at least one processing unit 1110 and a system memory 1120. The system memory 1120 may include, but is not limited to, volatile storage (e.g., random access memory), non-volatile storage (e.g., read-only memory), flash memory, or any combination of such memories. The system memory 1120 may also include an operating system 1130 that controls the operation of the computing device 1100 and one or more program modules 1140. A number of different program modules and data files may be stored in the system memory 1120. While executing on the processing unit 1110, the program modules 1140 may perform the various processes described above. In one example, the program modules 1140 include the client application 110, user data service 109, key management service 104, or other aspects described herein.

The computing device 1100 may also have additional features or functionality. For example, the computing device 1100 may include additional data storage devices (e.g., removable and/or non-removable storage devices) such as, for example, magnetic disks, optical disks, or tape. These additional storage devices are labeled as a removable storage 1160 and a non-removable storage 1170.

Examples of the disclosure may also be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 11 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the computing device 1100 on the single integrated circuit (chip). The disclosure may also be practiced using other technologies capable of performing logical operations such as, for example, AND, OR, and NOT, including but not limited to mechanical, optical, fluidic, and quantum technologies.

The computing device 1100 may include one or more communication systems 1180 that enable the computing device 1100 to communicate with other computing devices 1195 such as, for example, routing engines, gateways, signing systems and the like. Examples of communication systems 1180 include, but are not limited to, wireless communications, wired communications, cellular communications, radio frequency (RF) transmitter, receiver, and/or transceiver circuitry, a Controller Area Network (CAN) bus, a universal serial bus (USB), parallel, serial ports, etc.

The computing device 1100 may also have one or more input devices and/or one or more output devices shown as input/output devices 1190. These input/output devices 1190 may include a keyboard, a sound or voice input device, haptic devices, a touch, force and/or swipe input device, a display, speakers, etc. The aforementioned devices are examples and others may be used.

The term computer-readable media as used herein may include computer storage media. Computer storage media may include volatile and nonvolatile, removable and non-removable media implemented in any method or technology for storage of information, such as computer readable instructions, data structures, or program modules.

The system memory 1120, the removable storage 1160, and the non-removable storage 1170 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1100. Any such computer storage media may be part of the computing device 1100. Computer storage media is tangible and non-transitory, and does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

As discussed, the computing device 1100 may include one or more secure enclave(s). That is one or more of the resources (e.g., processing unit(s) 1110, system memory 1120, and/or application(s) 110, among other things) may be duplicated and/or allocated to one or more secure enclave(s) within computing device 1100. In examples, a secure enclave may also be referred to as a trusted execution environment. The secure enclave may comprise a computing environment that provides isolation for code and data from the operating system 1130 using either hardware-based isolation or isolating an entire virtual machine by placing the hypervisor within a trusted computing base. In examples, users with physical and/or root access to the computing device 1100 and operating system 1130 are prevented from accessing the contents of the secure enclave memory or tampering with the execution of code within the secure enclave. Nonexclusive, nonlimiting examples of secure enclaves are available for consumer electronics devices, computers/servers, data centers, etc., including from vendors such as Intel, AMD, and Amazon Web Services. Other examples of secure enclaves are possible and contemplated.

Aspects may be implemented as a computer process (method), a computing system, or as an article of manufacture, such as a computer program product or computer-readable storage medium. The computer program product may be a computer storage medium readable by a computer system and encoding a computer program of instructions for executing a computer process. Accordingly, hardware or software (including firmware, resident software, microcode, etc.) may provide aspects discussed herein. Aspects may take the form of a computer program product on a computer-usable or computer-readable storage medium having computer-usable or computer-readable program code embodied in the medium for use by, or in connection with, an instruction execution system.

Aspects of the present invention may be used in various distributed computing environments where tasks are performed by remote processing devices that are linked through a communications network.

Aspects of the invention may be implemented via local and remote computing and data storage systems. Such memory storage and processing units may be implemented in a computing device. Any suitable combination of hardware, software, or firmware may be used to implement the memory storage and processing unit. For example, the memory storage and processing unit may be implemented with computing device 1100 or any other computing devices 1195, in combination with computing device 1100, wherein functionality may be brought together over a network in a distributed computing environment, for example, an intranet or the Internet, to perform the functions as described herein. The systems, devices, and processors described herein are provided as examples; however, other systems, devices, and processors may comprise the aforementioned memory storage and processing unit, consistent with the described aspects.

Aspects of the present invention, for example, are described above with reference to block diagrams and/or operational illustrations of methods, systems, and computer program products according to aspects of the invention. The functions/acts noted in the blocks may occur out of the order as shown in any flowchart. For example, two operations shown in succession may in fact be executed substantially concurrently or the operations may sometimes be executed in the reverse order, depending upon the functionality/acts involved. Further, as used herein and in the claims, the phrase "at least one of element A, element B, or element C" is intended to convey any of: element A, element B, element C, elements A and B, elements A and C, elements B and C, and elements A, B, and C.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed:

1. A method for protecting user data, comprising:
   establishing a secure enclave on a parent server;
   receiving, at the secure enclave, an enclave local key;
   storing the enclave local key;
   establishing a channel between a client application and the secure enclave;
   receiving, at the secure enclave and from the client application, proof of authentication for a user;
   verifying, by the secure enclave, the proof of authentication;
   decrypting, by the secure enclave, a domain master key for a domain of the user using the enclave local key;
   determining, by the secure enclave, a user's secret data based on the domain master key; and
   providing to the client application the user's secret data via the channel.

2. The method of claim 1, wherein determining, by the secure enclave, the user's secret data comprises:
   retrieving the user's secret data from storage, wherein the user's secret data is encrypted; and decrypting the user's secret data based on the domain master key.

3. The method of claim 1, wherein determining, by the secure enclave, the user's secret data comprises:
generating the user's secret data;
encrypting the user's secret data based on the domain master key; and
storing the encrypted user's secret data.

4. The method of claim 1, wherein receiving, at the secure enclave, the enclave local key comprises:
requesting, by the secure enclave, the enclave local key from a key management service;
establishing a secure channel between the key management service and the secure enclave;
receiving the enclave local key from the key management service via the secure channel; and
receiving an encrypted enclave local key, wherein the encrypted enclave local key is encrypted based on an enclave master key stored by the key management service.

5. The method of claim 4, wherein storing the enclave local key comprises:
requesting, by the secure enclave, storage of the encrypted enclave local key on a data store external the secure enclave.

6. The method of claim 1, wherein verifying, by the secure enclave, the proof of authentication comprises:
receiving, in the proof of authentication, an Identity Provider (IdP) certificate and domain associated with an Identity Access Management (IAM) system;
accessing a stored IdP certificate and domain associated with the IAM system; and
verifying the proof authentication using the stored IdP certificate and domain associated with the IAM system.

7. The method of claim 6, further comprising verifying a signature of the signed IdP certificate and domain based on the enclave local key.

8. The method of claim 1, further comprising:
receiving, at the secure enclave, a set of System for Cross-domain Identity Management (SCIM) sharing keys including a bearer token and a signature key;
storing the bearer token and signature key;
establishing a secure channel between a client application and the secure enclave;
receiving, at the secure enclave and from the IAM system, a request to sign a user or group event;
verifying, by the secure enclave, a token included in the request using the bearer token; and
signing the user or group event using the signature key.

9. A system for protecting user data, wherein the system includes:
at least one processor; and
memory storing instructions that, when executed by the at least one processor, cause the system to:
establish a secure enclave on a parent server;
receive, at the secure enclave, an enclave local key;
store the enclave local key;
establish a channel between a client application and the secure enclave;
receive, at the secure enclave and from the client application, proof of authentication for a user;
verify, by the secure enclave, the proof of authentication;
decrypt, by the secure enclave, a domain master key for a domain of the user using the enclave local key;
determine, by the secure enclave, a user's secret data based on the domain master key; and
provide to the client application the user's secret data via the channel.

10. The system of claim 9, wherein in determining, by the secure enclave, the user's secret data, the instructions cause the system to:
retrieve the user's secret data from storage, wherein the user's secret data is encrypted; and
decrypt the user's secret data based on the domain master key.

11. The system of claim 9, wherein in determining, by the secure enclave, the user's secret data, the instructions cause the system to:
generate the user's secret data;
encrypt the user's secret data based on the domain master key; and
store the encrypted user's secret data.

12. The system of claim 9, wherein in receiving, at the secure enclave, the enclave local key, the instructions cause the system to:
request, by the secure enclave, the enclave local key from a key management service;
establish a secure channel between the key management service and the secure enclave;
receive the enclave local key from the key management service via the secure channel; and
receive an encrypted enclave local key, wherein the encrypted enclave local key is encrypted based on an enclave master key stored by the key management service.

13. The system of claim 12, wherein in storing the enclave local key, the instructions cause the system to:
request, by the secure enclave, storage of the encrypted enclave local key on a data store external the secure enclave.

14. The system of claim 9, wherein in verifying, by the secure enclave, the proof of authentication, the instructions cause the system to:
receive, in the proof of authentication, an Identity Provider (IdP) certificate and domain associated with an Identity Access Management (IAM) system;
access a stored IdP certificate and domain associated with the IAM system; and
verify the proof authentication using the stored IdP certificate and domain associated with the IAM system.

15. The system of claim 14, wherein the instructions further cause the system to verify a signature of the signed IdP certificate and domain based on the enclave local key.

16. The system of claim 9, wherein the instructions further cause the system to:
receive, at the secure enclave, a set of System for Cross-domain Identity Management (SCIM) sharing keys including a bearer token and a signature key;
store the bearer token and signature key;
establish a secure channel between a client application and the secure enclave;
receive, at the secure enclave and from the IAM system, a request to sign a user or group event;
verify, by the secure enclave, a token included in the request using the bearer token; and
sign the user or group event using the signature key.

17. A non-transitory computer-storage medium including instructions that, when executed by a computing device, cause the computing device to:
establish a secure enclave on a parent server;
receive, at the secure enclave, an enclave local key;
store the enclave local key;

establish a channel between a client application and the secure enclave;

receive, at the secure enclave and from the client application, proof of authentication for a user;

verify, by the secure enclave, the proof of authentication;

decrypt, by the secure enclave, a domain master key for a domain of the user using the enclave local key;

determine, by the secure enclave, a user's secret data based on the domain master key; and provide to the client application the user's secret data via the channel.

18. The non-transitory computer-storage medium of claim 17, wherein in determining, by the secure enclave, the user's secret data, the instructions cause the computing device to:

retrieve the user's secret data from storage, wherein the user's secret data is encrypted; and
  decrypt the user's secret data based on the domain master key; or
generate the user's secret data;
  encrypt the user's secret data based on the domain master key; and
  store the encrypted user's secret data.

19. The non-transitory computer-storage medium of claim 17, wherein in receiving, at the secure enclave, the enclave local key, the instructions cause the computing device to:

request, by the secure enclave, the enclave local key from a key management service;

establish a secure channel between the key management service and the secure enclave;

receive the enclave local key from the key management service via the secure channel; and receive an encrypted enclave local key, wherein the encrypted enclave local key is encrypted based on an enclave master key stored by the key management service.

20. The non-transitory computer-storage medium of claim 17, wherein the instructions further cause the computing device to:

receive, at the secure enclave, a set of System for Cross-domain Identity Management (SCIM) sharing keys including a bearer token and a signature key;

store the bearer token and signature key;

establish a secure channel between a client application and the secure enclave;

receive, at the secure enclave and from the IAM system, a request to sign a user or group event;

verify, by the secure enclave, a token included in the request using the bearer token; and sign the user or group event using the signature key.

* * * * *